United States Patent
Weiner et al.

(10) Patent No.: US 9,946,919 B2
(45) Date of Patent: Apr. 17, 2018

(54) DEVICE, SYSTEM, AND METHOD FOR FORENSIC ANALYSIS

(71) Applicant: Booz Allen Hamilton, McLean, VA (US)

(72) Inventors: Adam Weiner, Westborough, MA (US); Jonathan Levitt, Westborough, MA (US); Shawn Neugebauer, Westborough, MA (US)

(73) Assignee: BOOZ ALLEN HAMILTON INC., McLean, VA (US)

( * ) Notice: Subject to any disclaimer, the term of this patent is extended or adjusted under 35 U.S.C. 154(b) by 0 days.

(21) Appl. No.: 14/946,220

(22) Filed: Nov. 19, 2015

(65) Prior Publication Data

US 2016/0140381 A1 May 19, 2016

Related U.S. Application Data

(60) Provisional application No. 62/082,000, filed on Nov. 19, 2014.

(51) Int. Cl.
*G06K 9/00* (2006.01)
*G06F 1/16* (2006.01)

(52) U.S. Cl.
CPC ....... *G06K 9/00087* (2013.01); *G06F 1/1626* (2013.01); *G06F 1/1696* (2013.01); *G06K 9/00013* (2013.01)

(58) Field of Classification Search
CPC ............ G06K 9/00087; G06K 9/00013; G06F 1/1696; G06F 1/1626
See application file for complete search history.

(56) References Cited

U.S. PATENT DOCUMENTS 5,313,265 A * 5/1994 Hayes ................ G01B 9/02064
356/511
5,812,252 A * 9/1998 Bowker ................ F41A 17/066
250/227.11

(Continued)

FOREIGN PATENT DOCUMENTS

WO 03004969 A1 1/2003
WO 2004109649 A1 12/2004

OTHER PUBLICATIONS

"We Are Public Safety's Trusted Digital Notebook"; https://scenedoc.com/. (13 pages).

*Primary Examiner* — Mia M Thomas
(74) *Attorney, Agent, or Firm* — Buchanan Ingersoll & Rooney PC

(57) ABSTRACT

A portable, handheld device for forensic analysis includes an input unit configured to receive a forensic input at a scene of forensic analysis, and a processing unit. The processing unit is configured to generate a first image of the forensic input, scale the first image to a predetermined format suitable for forensic analysis, generate a second image of the forensic input in which the first image is scaled to the predetermined format, compare the second image with forensic records, which each respectively include previously collected forensic data associated with one or more individuals or specimens, determine whether the second image matches at least a portion of one of the forensic records, upon determining that the second image matches at least a portion of one of the forensic records, generate a matching notification identifying the record which the second image is determined to match, and output the generated matching notification.

24 Claims, 28 Drawing Sheets

Continued

(56) References Cited

U.S. PATENT DOCUMENTS

| | | | |
|---|---|---|---|
| 6,891,148 B1 | 5/2005 | Rivera et al. | |
| 7,489,391 B2* | 2/2009 | Engheta | A61B 5/1172 356/71 |
| 7,496,959 B2 | 2/2009 | Adelstein et al. | |
| 7,545,969 B2 | 6/2009 | Bennett et al. | |
| 8,396,319 B2* | 3/2013 | Pugh, Jr. | G06K 9/2036 348/254 |
| 9,361,507 B1* | 6/2016 | Hoyos | G06K 9/00073 |
| 9,465,974 B2* | 10/2016 | Kerr | G06K 9/00087 |
| 2003/0208689 A1 | 11/2003 | Garza | |
| 2005/0246763 A1* | 11/2005 | Corcoran | G06F 21/10 726/3 |
| 2007/0220274 A1* | 9/2007 | Jensen | G06F 21/32 713/186 |
| 2009/0064296 A1* | 3/2009 | Aikawa | G06F 21/32 726/6 |
| 2009/0171961 A1 | 7/2009 | Fredrickson | |
| 2010/0014717 A1* | 1/2010 | Rosenkrantz | G06K 9/00885 382/115 |
| 2010/0299430 A1 | 11/2010 | Powers et al. | |
| 2011/0302420 A1* | 12/2011 | Davida | G06F 21/32 713/180 |
| 2012/0102332 A1* | 4/2012 | Mullin | G06F 1/1626 713/186 |
| 2012/0318866 A1 | 12/2012 | McIntyre | |
| 2013/0287271 A1 | 10/2013 | Harper | |
| 2013/0301887 A1* | 11/2013 | Miesak | G06K 9/00013 382/124 |
| 2013/0336549 A1* | 12/2013 | Black | G06F 21/32 382/124 |
| 2014/0037158 A1* | 2/2014 | McNulty | G06K 9/00013 382/125 |
| 2014/0071292 A1* | 3/2014 | Miesak | G06K 9/2018 348/161 |
| 2014/0119619 A1* | 5/2014 | Miesak | G06K 9/00013 382/124 |
| 2014/0133715 A1* | 5/2014 | Ballard | G06K 9/00013 382/124 |
| 2014/0156657 A1 | 6/2014 | Kottoor et al. | |
| 2014/0232842 A1* | 8/2014 | Mullin | G06F 1/1626 348/78 |
| 2014/0244522 A1 | 8/2014 | McCreight | |
| 2014/0270417 A1* | 9/2014 | Lin | G06K 9/00154 382/124 |
| 2014/0270418 A1* | 9/2014 | Lin | G06K 9/00053 382/124 |
| 2015/0269409 A1* | 9/2015 | Weber | G06F 3/044 382/125 |
| 2016/0180152 A1* | 6/2016 | Rosenkrantz | G06K 9/00288 382/118 |
| 2016/0224841 A1* | 8/2016 | Rosenkrantz | G06K 9/00771 |
| 2016/0232401 A1* | 8/2016 | Hoyos | G06T 7/11 |
| 2017/0300678 A1* | 10/2017 | Metke | G06F 21/32 |

* cited by examiner

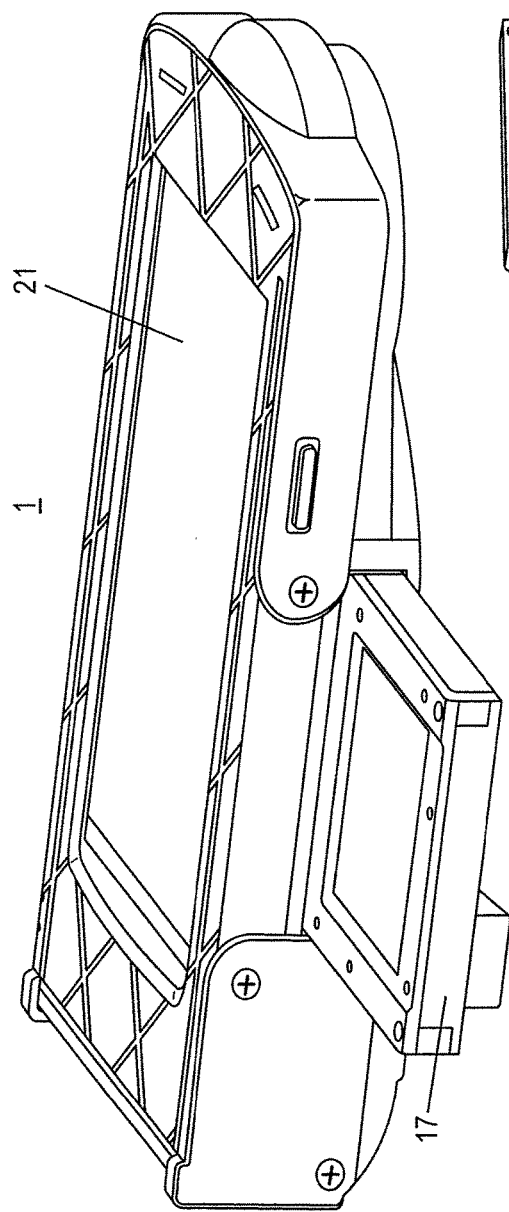
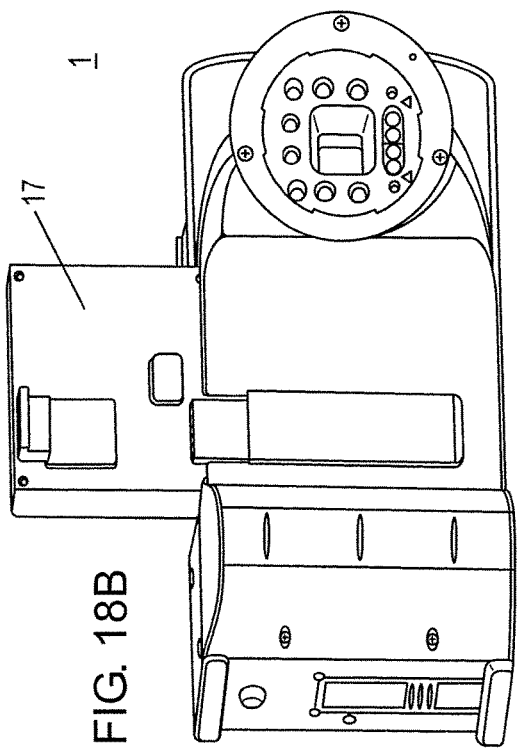
FIG. 18A
FIG. 18B

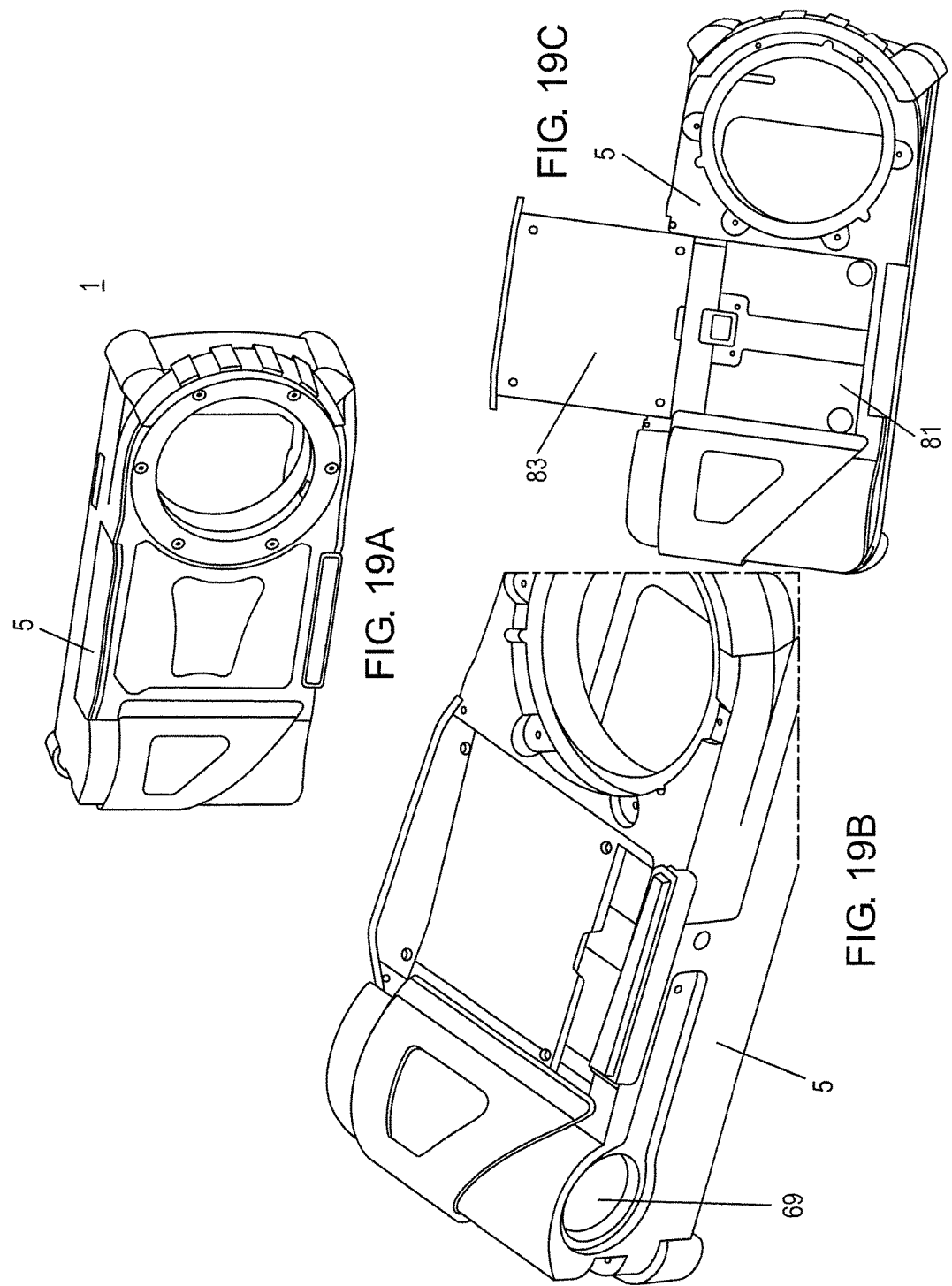

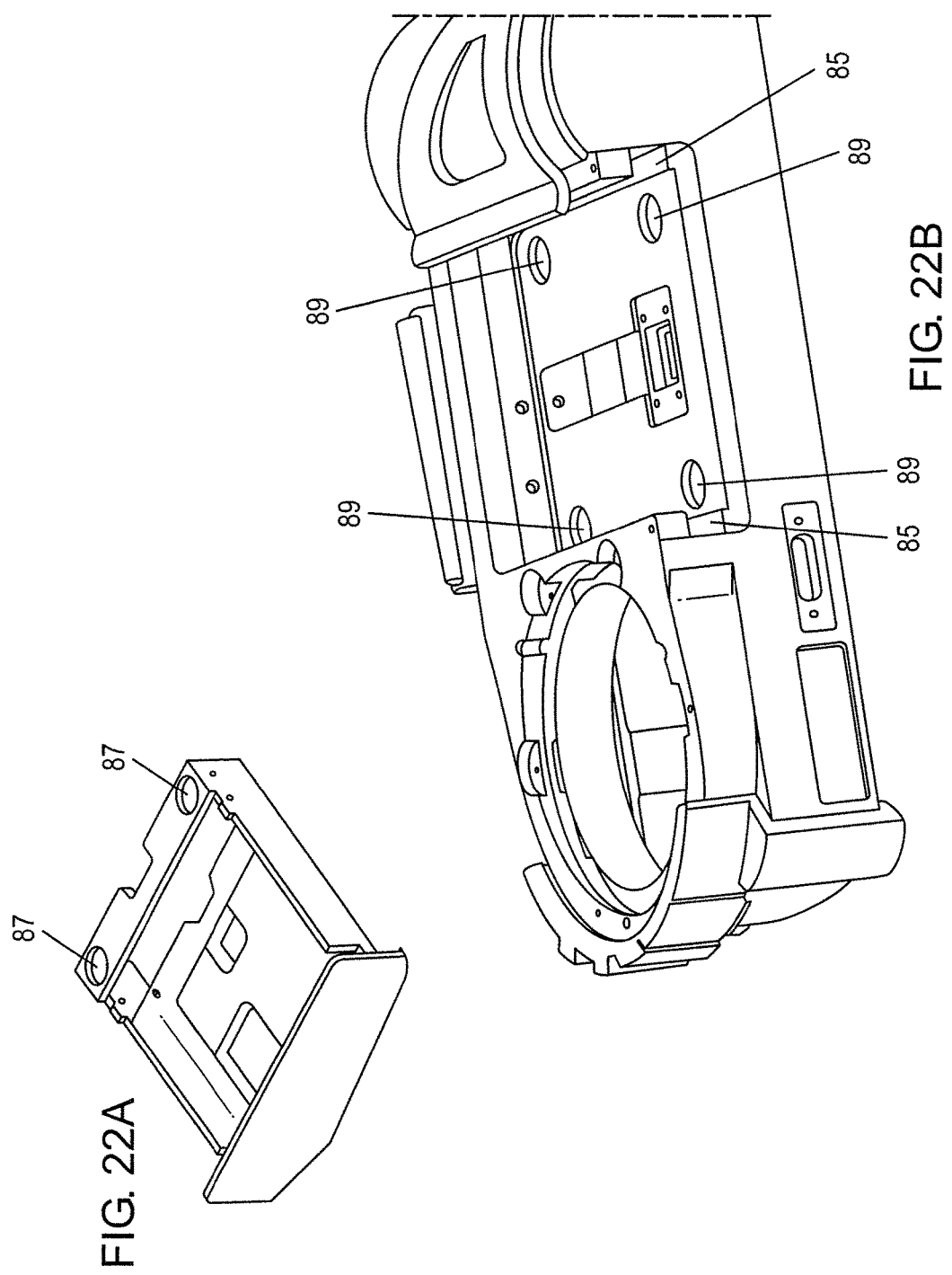

DEVICE, SYSTEM, AND METHOD FOR FORENSIC ANALYSIS

CROSS-REFERENCE TO RELATED APPLICATIONS

This application claims the benefit of U.S. Provisional Application No. 62/082,000, filed on Nov. 19, 2014, the contents of which are incorporated herein by reference in their entirety.

FIELD

The present disclosure relates to a tactical forensics system (TFS), which includes a handheld device for forensic analysis that facilitates the collection and analysis of forensic data at a scene of forensic analysis at which the forensic data is collected. According to an exemplary embodiment, the handheld device is a rugged, modular, and tactical forensic device for sensitive site exploitation (SSE) and other law enforcement agency (LEA) operations which can be used for quickly and efficiently triaging a site (or sites), generating leads, and identifying subjects from collected samples.

BACKGROUND

According to known techniques, forensic material is currently collected in bulk and sent to a lab for identification when processing forensic material at an incident scene. It can take hours-to-days for DNA and fingerprint ID results, preventing a tactical, real-time response. However, such data could yield time-critical information that may be vital to an investigation. Consider these use cases:

Child kidnapping, where the abductors keep moving locations;

Arson scene or Post-IED incidents, where the offender may be in the crowd;

Asset validation;

Fugitive, criminal, terrorist apprehension;

Grave Site detection

According to known techniques, there is a large gap in operators' ability to identify and process forensic samples and/or evidence in the field. During any of the above criminal forensic events, time is of the essence, as samples can degrade over time. According to known techniques, samples and/or evidence must be sent back to a laboratory for analysis and identification. This analysis can take days, and prevents real-time response and actionable intelligence, robbing operators of timely and critical leads. In addition, labs must sort through a multitude of high volume/low value samples obtained while on the scene to find critical forensic evidence. This is a tedious process that can create a large backlog of forensic and biometric samples, which slows down processing times and increases costs.

SUMMARY

An exemplary embodiment of the present disclosure provides a portable, handheld device for forensic analysis. The device includes: a memory unit having an executable program recorded therein; an input unit configured to receive a forensic input (e.g., a latent fingerprint) at a scene of forensic analysis at which the forensic input is collected; and a processing unit configured to, by executing the program recorded in the memory unit at the scene of forensic analysis, generate a first image of the received forensic input, scale the generated first image to a predetermined format suitable for forensic analysis, and generate a second image of the forensic input in which the first image is scaled to the predetermined format, record the second image of the forensic input in the memory unit, compare the second image with forensic records, each forensic record respectively including previously collected forensic data associated with one or more individuals or specimens, determine whether the second image matches at least a portion of at least one of the forensic records based on the comparison, upon determining that the second image matches at least a portion of at least one of the forensic records, generate a matching notification identifying the at least one record which the second image is determined to match, and output the generated matching notification on the device.

An exemplary embodiment of the present disclosure provides a method for forensic analysis using a portable, handheld device. The method includes: receiving, by an input unit of the device, a forensic input (e.g., a latent fingerprint) at a scene of forensic analysis at which the forensic input is collected; generating, by a processing unit of the device, a first image of the received forensic input; scaling, by the processing unit, the generated first image to a predetermined format suitable for forensic analysis; generating, by the processing unit, a second image of the forensic input in which the first image is scaled to the predetermined format; recording, by the processing unit, the second image of the forensic input in a memory unit of the device; comparing, by the processing unit, the second image with forensic records, each forensic record respectively including previously collected forensic data associated with one or more individuals or specimens; determining, by the processing unit, whether the second image matches at least a portion of at least one of the forensic records based on the comparison; upon determining that the second image matches at least a portion of at least one of the forensic records, generating, by the processing unit, a matching notification identifying the at least one record which the second image is determined to match; and outputting, by the processing unit, the generated matching notification on the device.

An exemplary embodiment of the present disclosure provides a non-transitory computer-readable storage medium having computer-readable instructions tangibly recorded thereon which, when executed by a processing unit of a portable handheld device for forensic analysis, cause the processing unit to perform a method for forensic analysis. The method includes: receiving a forensic input (e.g., a latent fingerprint) at a scene of forensic analysis at which the forensic input is collected; generating a first image of the received forensic input; scaling the generated first image to a predetermined format suitable for the forensic analysis; generating a second image of the forensic input in which the first image is scaled to the predetermined format; recording the second image of the forensic input in a memory unit of the device; comparing the second image with forensic records, each forensic record respectively including previously collected forensic data associated with one or more individuals or specimens; determining whether the second image matches at least a portion of at least one of the forensic records based on the comparison; upon determining that the second image matches at least a portion of at least one of the forensic records, generating a matching notification identifying the at least one record which the second image is determined to match; and outputting the generated matching notification on the device.

These and other features and advantages of particular embodiments of the device, system, and method for forensic analysis will now be described by way of exemplary embodiments to which they are not limited.

According to an exemplary embodiment, the handheld device provides end-users field-ready, portable forensic solutions to allow them to process, pre-screen, triage, and analyze forensic evidence in the field, when the subject of interest could be present or still in the area. The handheld device facilitates rapid, mobile forensic collection and identification which may provide investigative agents actionable, on-site answers to pressing identification intelligence challenges.

According to an exemplary embodiment, the handheld device may include, in part, commercial off-the-shelf mobile platforms and advanced imaging techniques using interchangeable lens and custom integrated circuit board designs, to develop a first-of-its-kind, integrated, tactical device for forensics analysis.

As a mobile tool for in-the-field operators, the handheld device of the present disclosure provides a unique, low-cost device which is modular, expandable, and upgradable to meet real-world identification challenges and which can provide field agents increased situational awareness, "day one" analytics, and more effective mission planning.

Investigative teams must quickly determine identities and process evidence at an incident. Go/no-go decisions most often need to be made within minutes, not hours. Agents can use the device for triaging a site, generating leads, and determining the age of forensic blood samples. The TFS of the present disclosure, with its handheld device having a modular, interchangeable lens design, can assist agents by providing the following capabilities:

Latent Fingerprint Detection and Matching
Age of Sample
Questioned Document Analysis
Arson/Explosive Compound Detection from Detainees or Evidence
Blood Visualization
Gunpowder Detection
Duct Tape Fiber Analysis
UV Thermal—Surveillance.

The handheld device is designed to minimize the operator's interaction with the technology, while increasing the user experience/capabilities. Forensic data is transmitted wirelessly so that SSE operators get answers to their fingerprint and DNA identification challenges without needless user workflow stop gaps. The handheld device allows SSE operators and teams to use their time more effectively and improves the intelligence gathered while on target. Latent fingerprints collected and documented on site that might take up to 7 days using known analysis techniques are presented as preliminary results to operators on the ground within minutes. "Day one" analytics replaces the long loop in the chain of custody that traditional forensics typically demands.

The handheld device's flexible software platform and interchangeable optics are ideal for SSE operators and investigative teams on remote, longer term missions where connectivity is severely limited. In addition, the handheld device is designed to leverage the existing biometric infrastructure investments deployed with police and military agencies, as it integrates with and augments current platform functionality. In effect, the handheld device of the present disclosure looks just below the surface, exposing new information and providing investigative leads and rapid intelligence, the "lifeblood" of an investigation, which otherwise wouldn't be available.

BRIEF DESCRIPTION OF THE DRAWINGS

The scope of the present disclosure is best understood from the following detailed description of exemplary embodiments when read in conjunction with the accompanying drawings. The following figures are included in the drawings.

FIG. 18A illustrates a top/back view of a handheld device that may be employed in accordance with an exemplary embodiment.

FIG. 18B illustrates a front view of a handheld device that may be employed in accordance with an exemplary embodiment.

FIG. 19A illustrates a front view of a handheld device that may be employed in accordance with an exemplary embodiment.

FIG. 19B illustrates a top/back view of a handheld device that may be employed in accordance with an exemplary embodiment.

FIG. 19C illustrates a back view of a handheld device that may be employed in accordance with an exemplary embodiment.

FIG. 22A illustrates a top view of a drawer for a fingerprint scanner that may be employed in accordance with an exemplary embodiment.

FIG. 22B illustrates an opening for the drawer that may be employed in accordance with an exemplary embodiment.

Further areas of applicability of the present disclosure will become apparent from the detailed description provided hereinafter. It should be understood that the detailed description of exemplary embodiments is intended for illustration purposes only and is, therefore, not intended to necessarily limit the scope of the disclosure.

DETAILED DESCRIPTION

This description provides exemplary embodiments only, and is not intended to limit the scope, applicability or configuration of the device, system, and method for forensic analysis of the present disclosure. Rather, the ensuing description of the embodiments will provide those skilled in the art with an enabling description for implementing embodiments of the device, system, and method of the present disclosure. Various changes may be made in the function and arrangement of elements without departing from the spirit and scope of the disclosure as set forth in the appended claims. Thus, various embodiments may omit, substitute, or add various procedures or components as appropriate. For instance, it should be appreciated that in alternative embodiments, the methods may be performed in an order different than that described, and that various steps may be added, omitted or combined. Also, features described with respect to certain embodiments may be combined in various other embodiments. Different aspects and elements of the embodiments may be combined in a similar manner.

Figure 1:
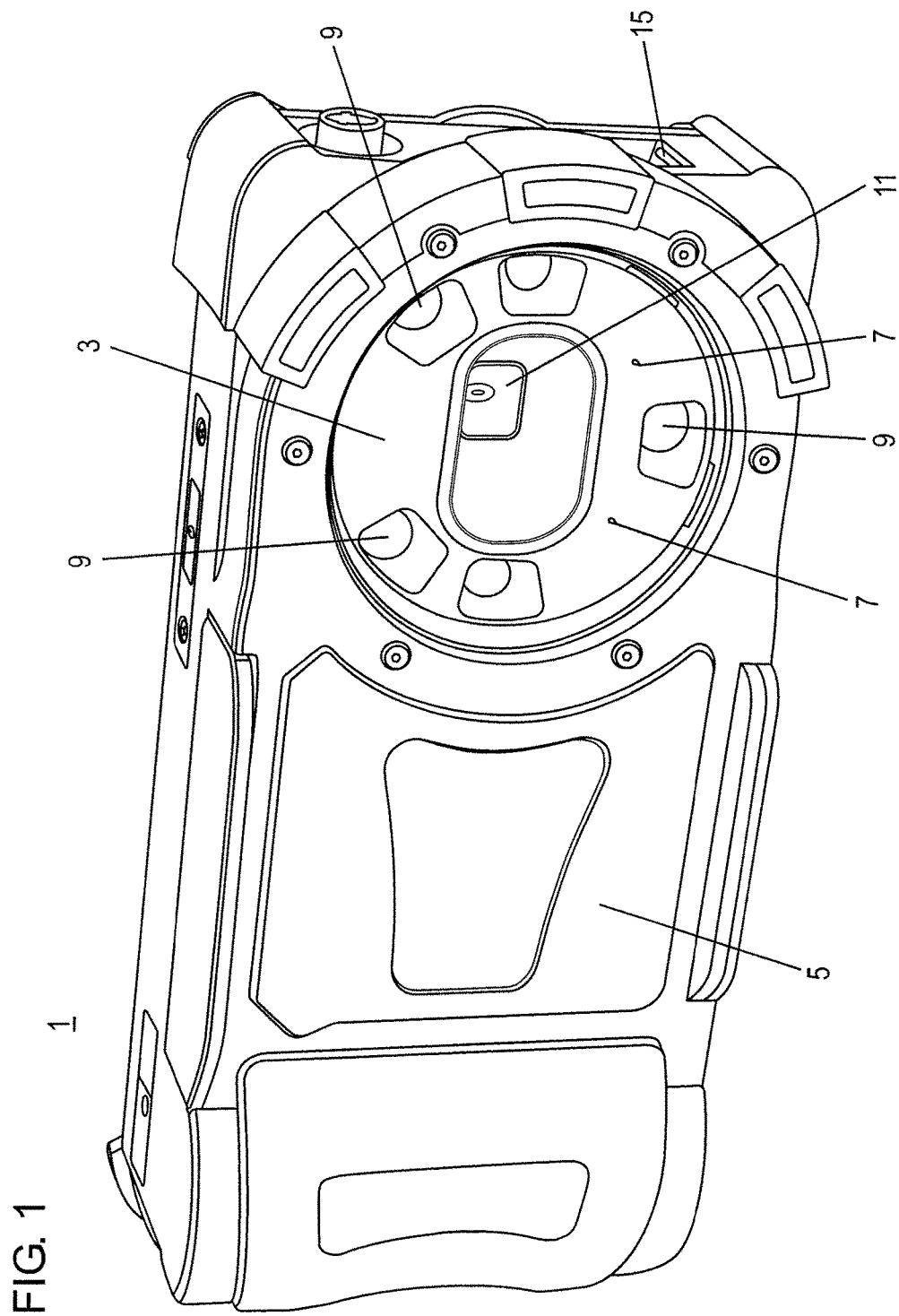
FIG. 1 illustrates a front view of a handheld device that may be employed in accordance with an exemplary embodiment.
Figure 2:
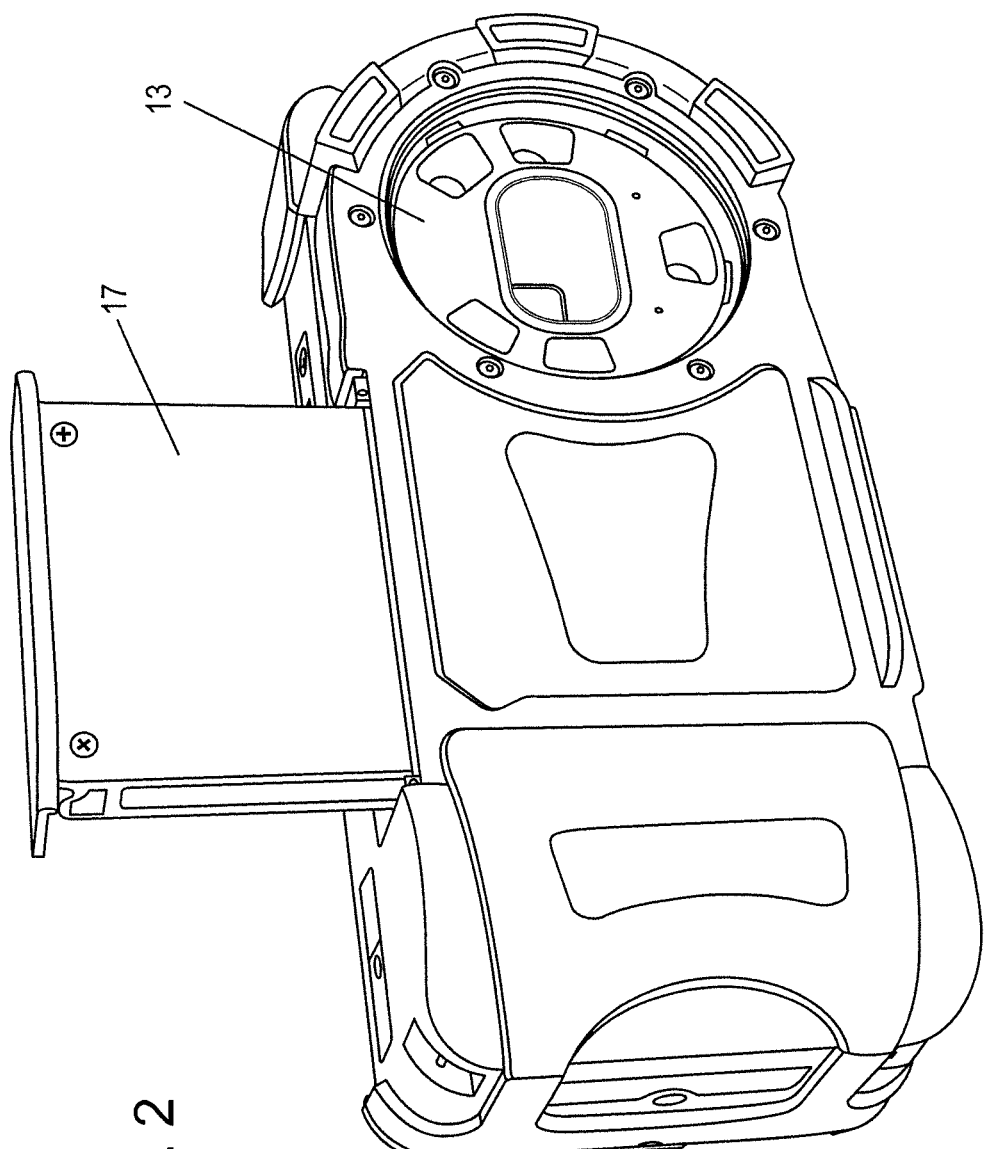
FIG. 2 illustrates a front view of a handheld device that may be employed in accordance with an exemplary embodiment.
Figure 3:
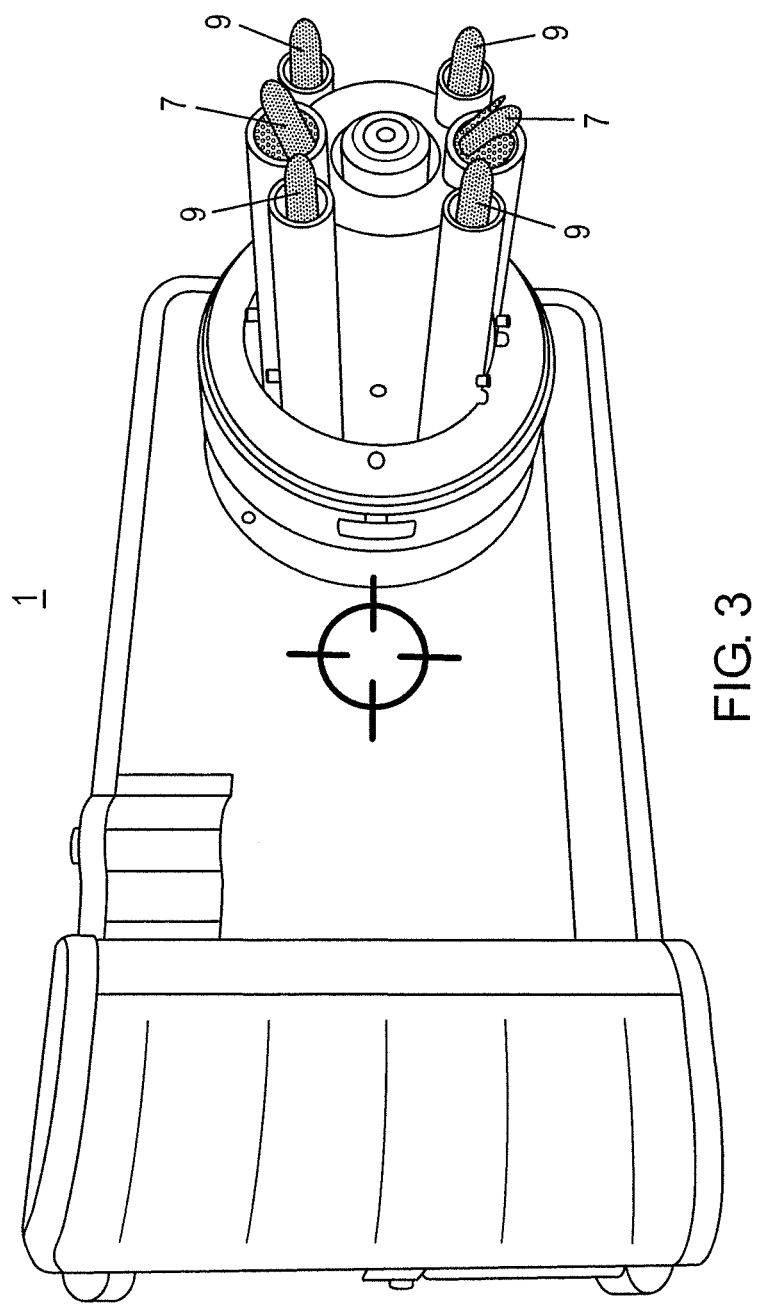
FIG. 3 illustrates a front view of a handheld device that may be employed in accordance with an exemplary embodiment
Figure 23:
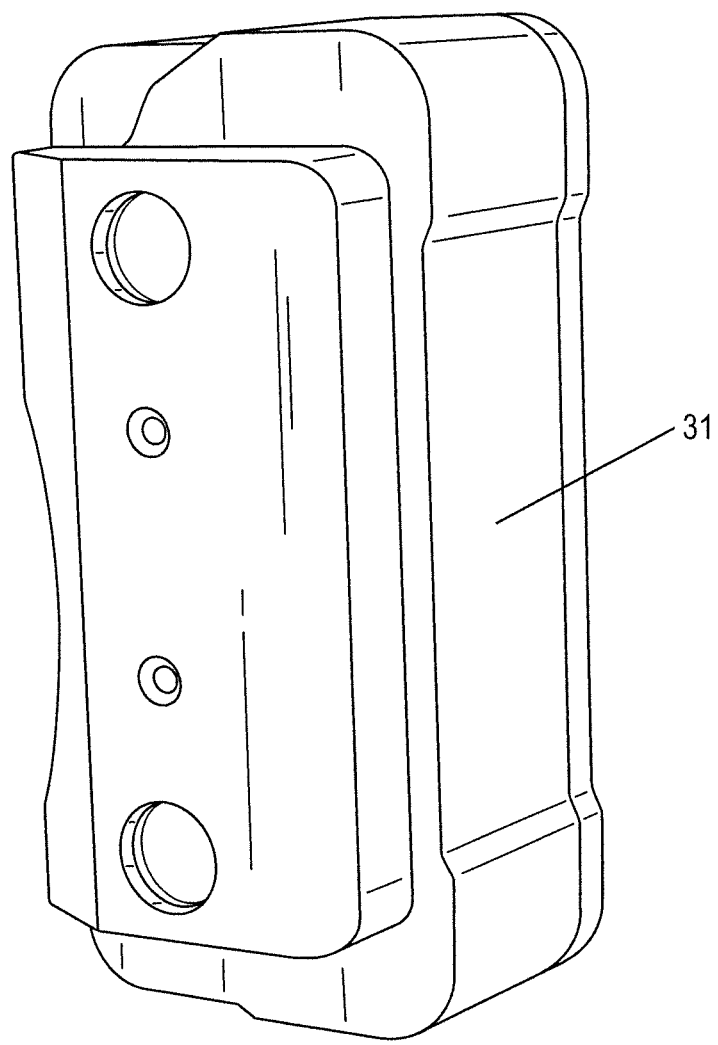
FIG. 23 illustrates an iris scanner attachment that may be employed in accordance with an exemplary embodiment.
Figure 24:
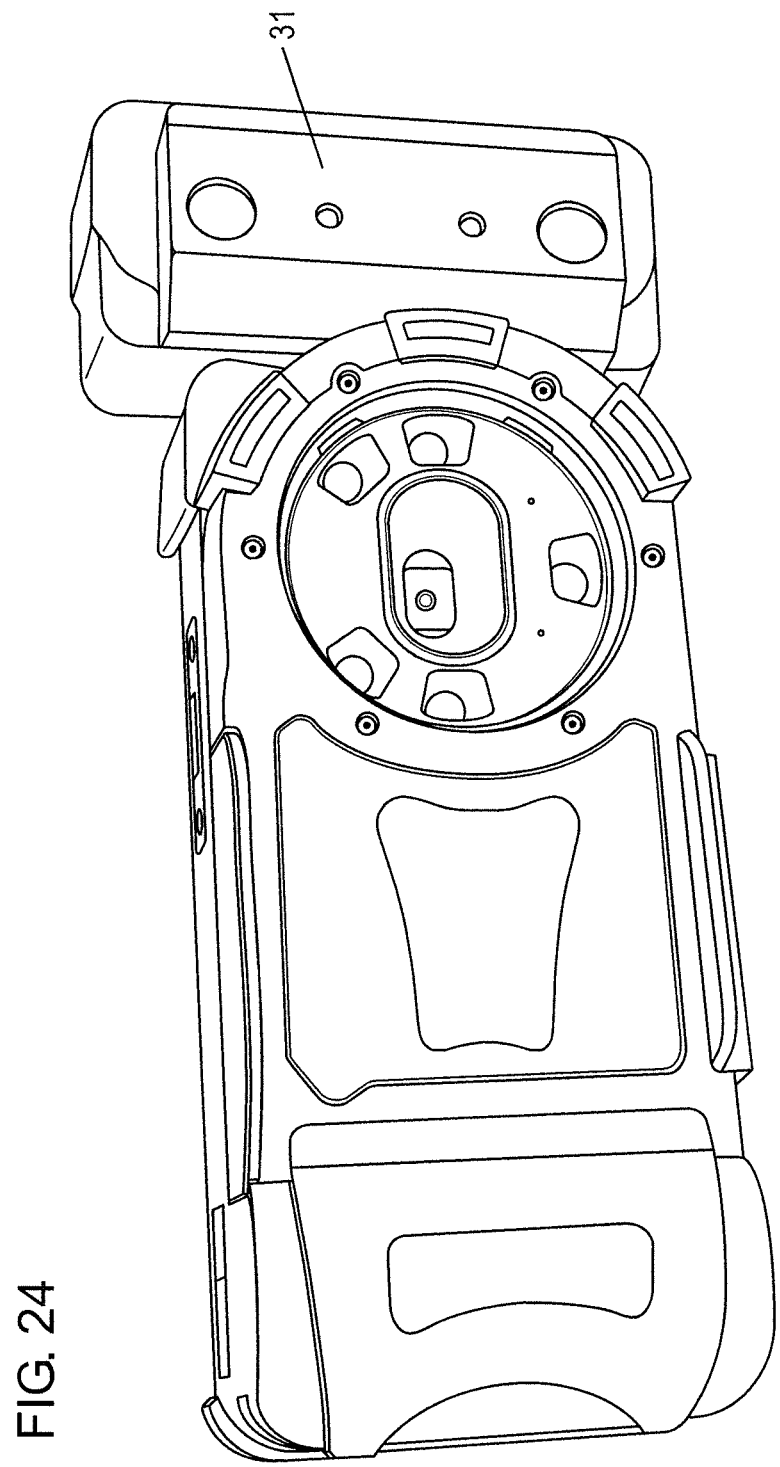
FIG. 24 illustrates the iris scanner attached to a handheld device that may be employed in accordance with an exemplary embodiment.

FIGS. 1-3 illustrate exemplary embodiments of the handheld device 1 of the present disclosure. As illustrated in FIGS. 1-3, the handheld device 1 includes a housing 5 into which the components of the handheld device 1 are housed or contained. As illustrated in FIGS. 1-3, the handheld device 1 includes a light source 3 having a plurality of lasers 7, a plurality of lights 9, and a camera 11. The handheld device 1 also includes at least one port 15 for bidirectional communication with an external computing device (e.g., laptop, desktop, tablet and/or server computers). As shown in FIG. 2, the handheld device 1 includes a fingerprint scanner 17 for obtaining live fingerprint data on the device 1. According to an exemplary embodiment, the light source 3 and fingerprint scanner 17 are components of an input unit of the handheld device 1 which is configured to receive a forensic input (e.g., latent and/or live fingerprint(s)) at a scene of forensic analysis at which the forensic input is collected. According to an exemplary embodiment, the input unit of the handheld device 1 can also include an iris scanner 31 as shown in FIGS. 23 and 24. In the exemplary embodiment of FIG. 2, a clear cover 13 may be provided over the light source 3 to provide protection to the components of the light source 13 from environmental contaminants (e.g., dust, dirt, moisture, etc.). Alternatively, the cover 13 can be tinted to enhance ambient lighting conditions, filter certain light colors, increase contrast and/or reduce glare. These and additional components of the handheld device 1 will be described in more detail below. The handheld device 1 quickly captures, collects and triages forensic material, expediting situational awareness for law enforcement personnel. The handheld device's 1 ability to perform on-site triaging streamlines laboratory procedures that decrease workloads, avoid growing backlogs and prevent delays in processing. According to an exemplary embodiment, the handheld device 1 uses FBI-standard EBTS formats that improve the efficiency of the collection and analysis of each forensic input. Fingerprints are also captured digitally and aggregated in real time, enabling forensic analyzers and other law enforcement personnel to link the prints and people at a scene. Law enforcement personnel can also use the handheld device 1 to query against their own biometric datasets.

The handheld device 1 is a multi-function device for use in processing multiple types of forensic evidence (exemplary applications include sensitive site exploitation, law enforcement crime scene investigation, etc.) on-site, in real-time (bounded latency), including latent fingerprints, detecting unknown substances, digital forensics of handheld devices 1, recording images/video of the scene with annotations.

The handheld device 1 is a mobile forensics lab in that it enables data collection, data processing, and biometric identification capabilities conveniently packaged in the handheld, portable device 1 with wireless connectivity.

Figure 9:
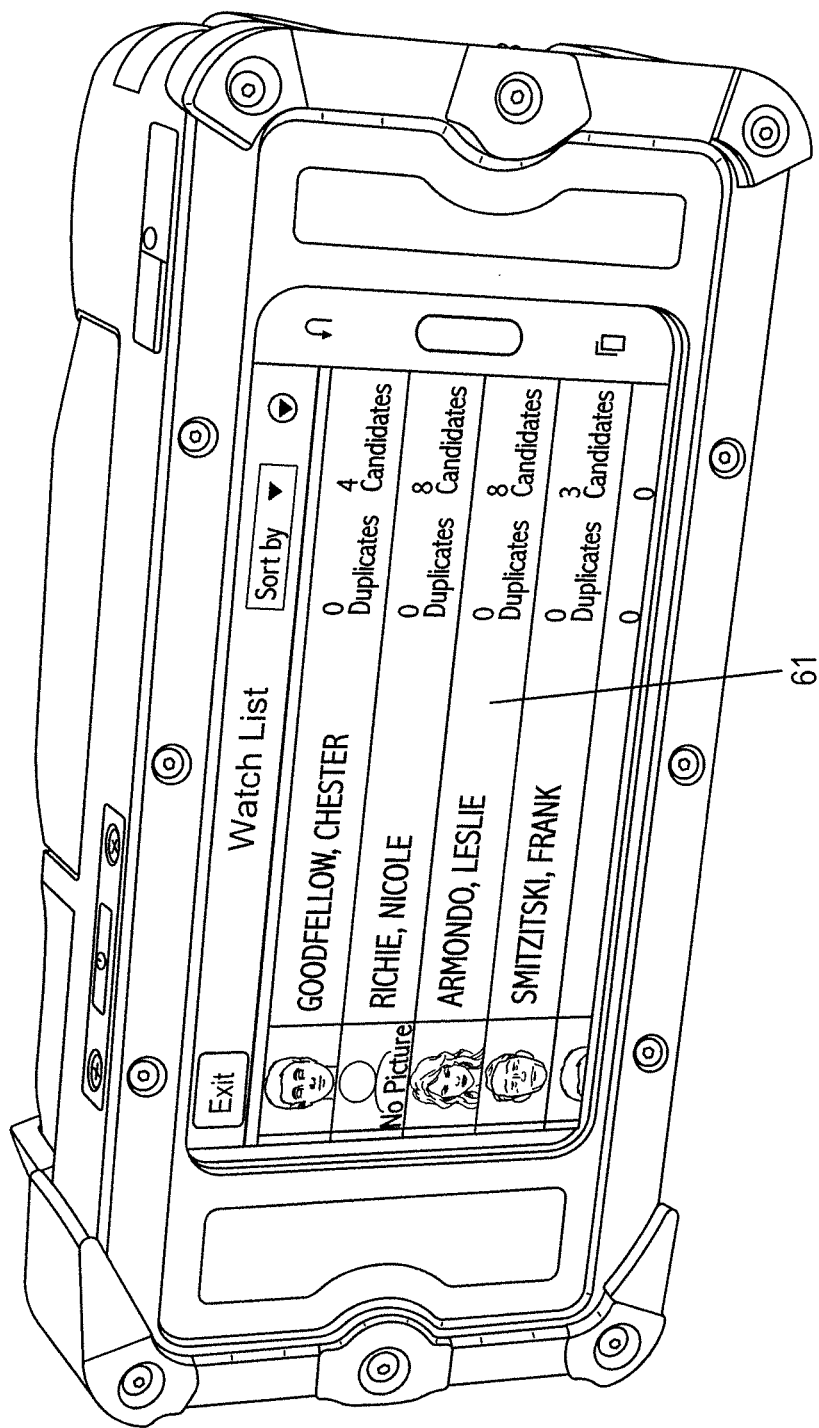
FIG. 9 illustrates a back view of a handheld device that may be employed in accordance with an exemplary embodiment.
Figure 17:
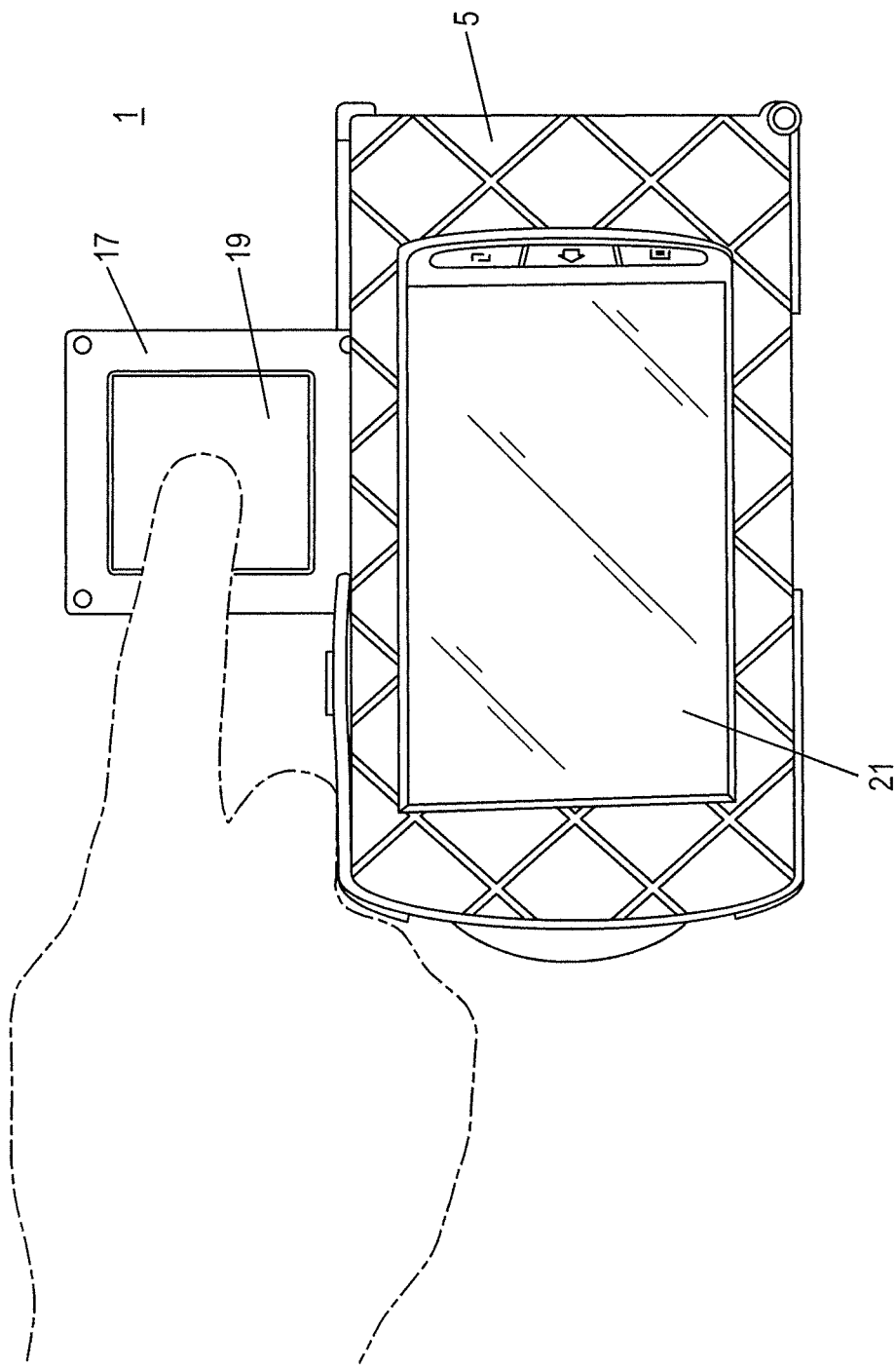
FIG. 17 illustrates a back view of a handheld device that may be employed in accordance with an exemplary embodiment.
Figure 20A:
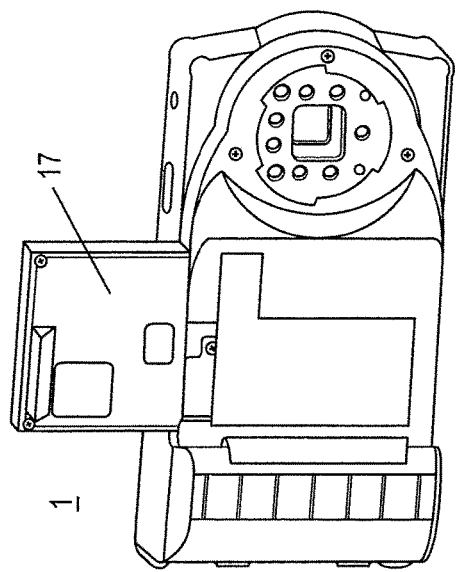
FIG. 20A illustrates a front view of a handheld device that may be employed in accordance with an exemplary embodiment.
Figure 20B:
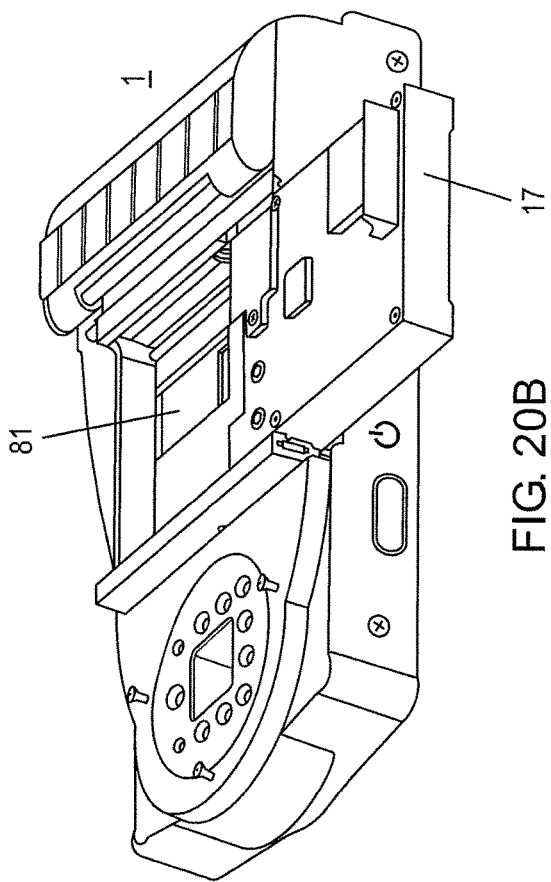
FIG. 20B illustrates a top/back view of a handheld device that may be employed in accordance with an exemplary embodiment.
Figure 20C:
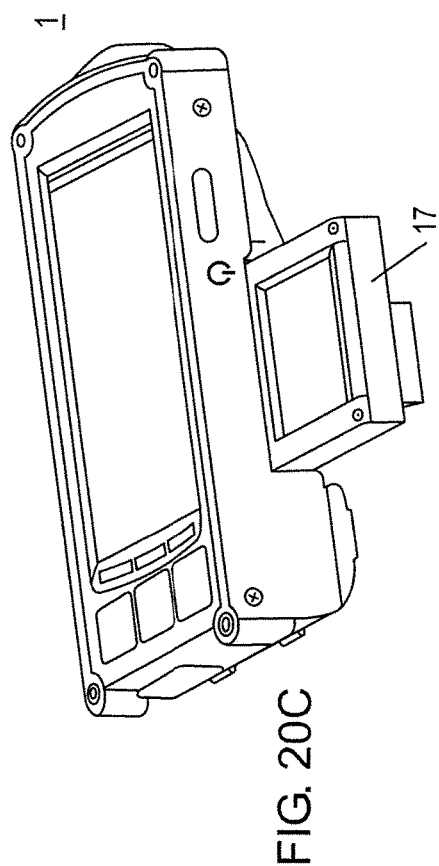
FIG. 20C illustrates a top/back view of a handheld device that may be employed in accordance with an exemplary embodiment.
Figure 21A:
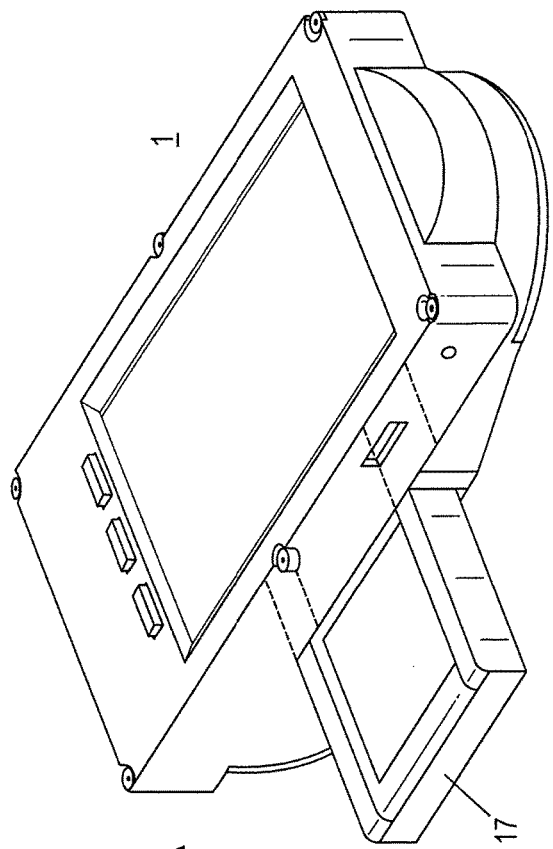
FIG. 21A illustrates a top/back view of a handheld device that may be employed in accordance with an exemplary embodiment.
Figure 21C:
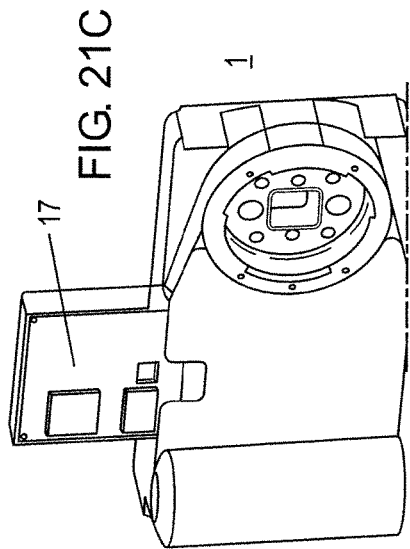
FIG. 21C illustrates a front view of a handheld device that may be employed in accordance with an exemplary embodiment.
Figure 21B:
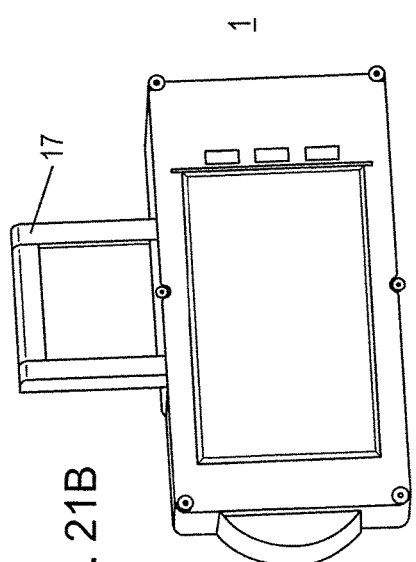
FIG. 21B illustrates a back view of a handheld device that may be employed in accordance with an exemplary embodiment.

The handheld device 1 of the present disclosure provides a multi-application forensic open architecture platform. According to an exemplary embodiment, the handheld device 1 can be used as a central forensics platform to process cell phone, media, document data, etc. The platform is customizable for a user's specific application, mission and solution. FIG. 17 illustrates an example in which the handheld device 1 is utilized as a central forensics platform. According to an exemplary embodiment, the handheld device 1 captures latent fingerprint images directly from various surfaces without using lifting tape, minimizing potential damage to prints, and resulting in better quality forensic evidence. The handheld device 1 is also versatile, conducting both live and latent identification to an on-board watch list (see, e.g., watch list 61 in FIG. 9), and can perform latent-to-latent matching, resulting in quick and easy identification of critical leads.

Figure 15:
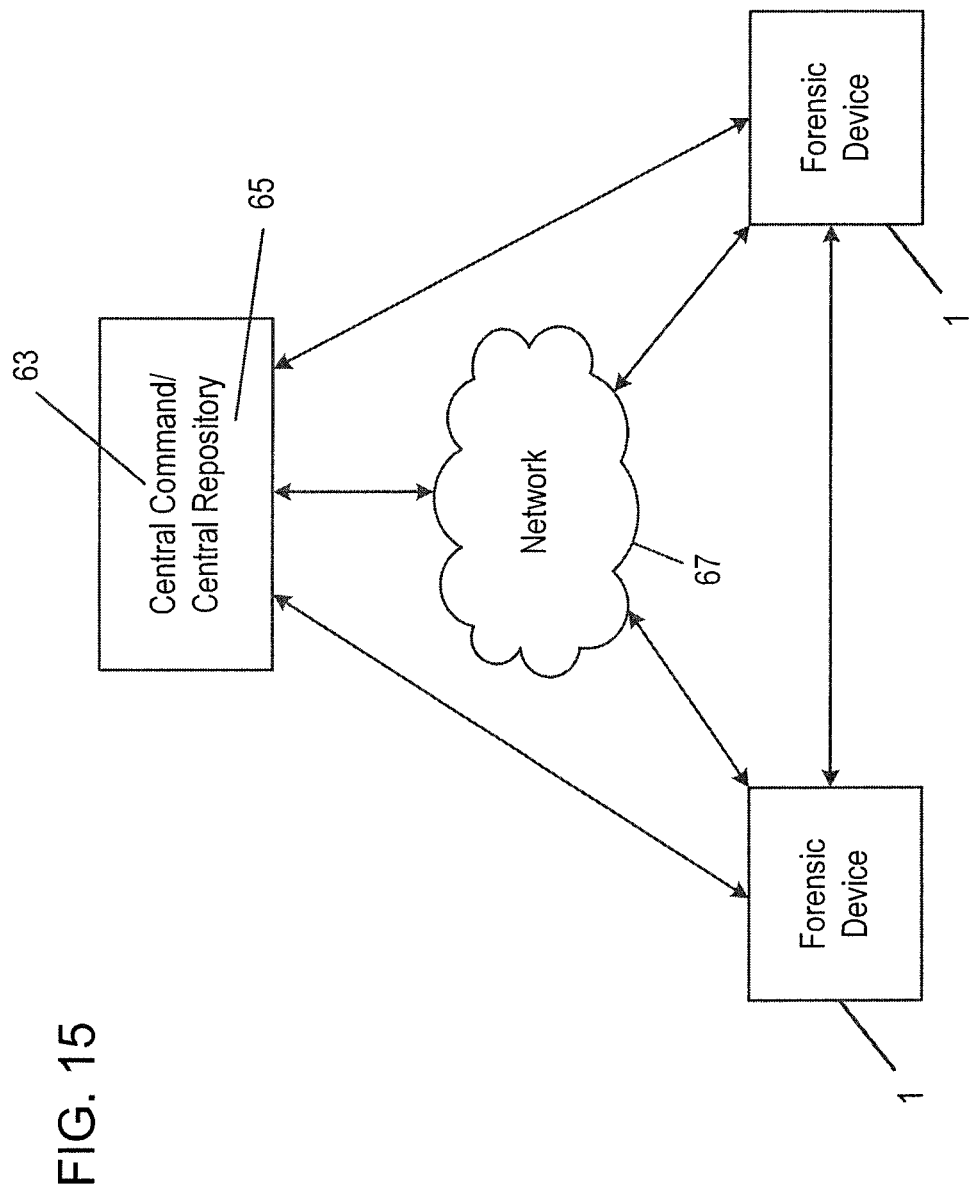
FIG. 15 illustrates an exemplary system architecture in accordance with an exemplary embodiment.
Figure 16:
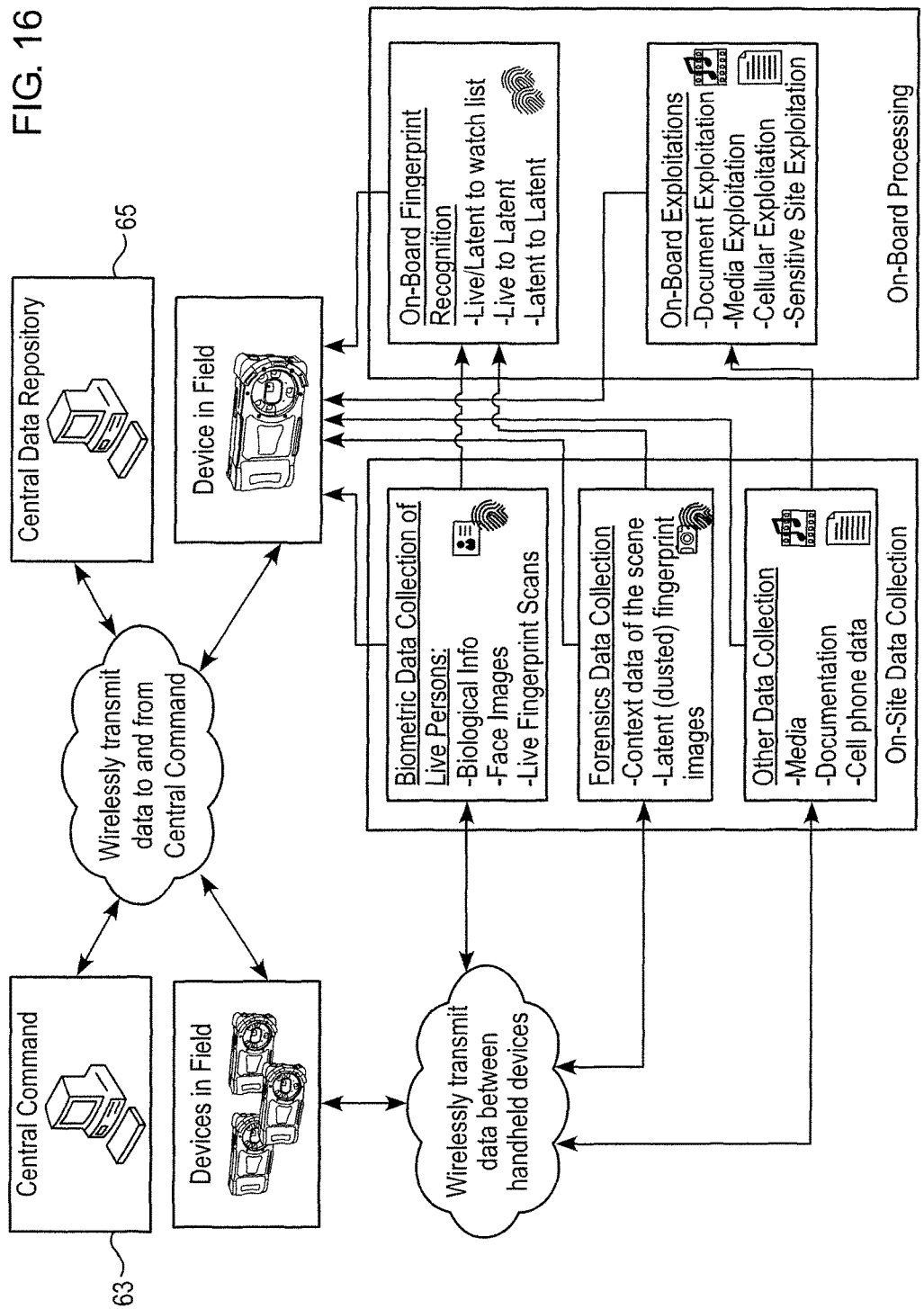
FIG. 16 illustrates an exemplary system architecture in accordance with an exemplary embodiment.

FIGS. 15-16 illustrate additional examples of the handheld device 1 of the present disclosure as a central forensic platform and associated communication schemes.

The handheld device 1 of the present disclosure conducts real-time forensic analysis in the field, performing fast and accurate, on-site human identification and analysis of sensitive evidence in a short time (e.g., seconds or minutes), rather than days. A hand-held forensics lab, the handheld device 1 is a ruggedized unit that integrates fingerprint analysis into a mobile device-type platform, creating a lightweight, portable device that requires little forensics knowledge to perform advanced forensic processing.

The handheld device 1 of the present disclosure is adaptable to changing operator requirements by using a modular design that incorporates custom solutions and future upgrades.

The handheld device 1 facilitates mobile case management. The mobile, handheld device 1 enables the collection and organization of data associated with various cases and scenes. Case data from different handheld devices of the present disclosure can be compiled and shared to further consolidate and organize all related case data even if collected by different technicians and/or device. Additionally, latent-to-latent matching capabilities can link cases.

The handheld device 1 of the present disclosure also provides a consolidated exploitation platform, by providing a centralized data collection for various exploitation modalities. The handheld device 1 can communicate with various proprietary systems to centralize numerous exploitation techniques.

The handheld device 1 provides ad hoc networking for forensic collection and processing. In addition to cellular communication capabilities, by using onboard Wi-Fi and Bluetooth communication capabilities, handheld devices 1 of the present disclosure can communicate with one another in the field, even in the absence of traditional wireless networks (e.g. communication denied areas). This allows technicians to quickly share data on-site between different handheld devices 1.

The handheld device 1 of the present disclosure provides for integrated communication with an external database (e.g., central command 63 and/or central data repository 65 in FIGS. 15 and 16). The handheld device 1 can export standards-compliant fingerprint images (latent and/or live) to an external database (egg: IAFIS) wirelessly in the field. After receiving results back from the external database, the handheld device 1 can import these results and compile the external match results with the on-device matches and collected information.

The handheld device 1 of the present disclosure also provides collaborative forensic tools. The handheld device 1 allows for forensic collaboration in the field through ad hoc networking. For example, team leaders can assign tasks, and end users each using a handheld device according to the present disclosure can collect and share data in real time. The supervisors/analysts can monitor and direct forensic actions in real-time. Because a captured latent fingerprint can be compared with existing fingerprint records on the handheld device, a match can be found in real time (e.g., under 10 minutes). Based on the number of records that are searched, a match can be determined in under 5 minutes, for example.

With regard to acquiring digital images of a latent fingerprint, the handheld device 1 enables latent fingerprints to be pre-prepared using a variety of common forensic fingerprint powders. The handheld device 1 automatically processes and matches these images to 1) fingerprint data of enrolled members of a watch list 61 (shown in FIG. 9), 2) to live scans acquired using the integrated fingerprint scanner 17 on the handheld device 1, and 3) to other captured latent fingerprint images.

The handheld device 1 provides latent-to-latent matching. The handheld device 1 has the ability to match images of dusted latent fingerprints to one another. The handheld device 1 also provides live-to-latent matching. The handheld device 1 can match images of dusted latent fingerprints to live fingerprint(s) scans acquired using the integrated fingerprint scanner 17.

According to an exemplary embodiment, the portable, handheld device 1 for forensic analysis includes: a memory unit (e.g., memory 73 and/or memory 75 in FIG. 5) having an executable (i.e., a computer-readable) program recorded therein, an input unit (e.g., light source 3 that includes lights 9 and lasers 7, and camera 11; fingerprint scanner 17; iris scanner 31, etc.) configured to receive a forensic input (e.g., latent fingerprint, live fingerprint, iris scan, etc.) at a scene of forensic analysis at which the forensic input is collected; and a processing unit 25. The processing unit 25 is configured to, by executing the program recorded in the memory unit 73, 75 at the scene of forensic analysis, generate a first image of the received forensic input. For example, the first image is an image captured by a digital camera 11 of the handheld device 1. The camera 11 can be part of the mobile computing device 23 (e.g., a smartphone, tablet, etc.) shown in FIG. 4. According to an exemplary embodiment, the handheld device 1 includes a custom hardware system with embedded smartphone 23, integrated fingerprint scanner 17, and integrated light sources 9, as well as additional peripheral components that may be added to the housing 5, such as iris scanner 31 in FIGS. 23 and 24. The handheld device 1 can use IR communication between the custom hardware system and the smartphone 23 to allow the user to control the hardware components via the on-screen user interface 21 of the phone 23.

As shown in FIG. 1, the light source 3 includes multiple lights 9 of different colors/types that can illuminate and facilitate the collection of the forensic input (e.g., fingerprint, blood, etc.). In FIG. 1, the light source 3 also includes a laser light source 7 that outputs at least two parallel lasers. The lights 9 and the laser light source 7 are covered by a clear cover 13 to protect these devices and prevent them from receiving moisture or debris. FIG. 3 shows an embodiment in which the lights 9 and the laser light source 7 protrude from the housing 5 of the handheld device 1. This configuration does not include the clear cover 13.

Figure 4:
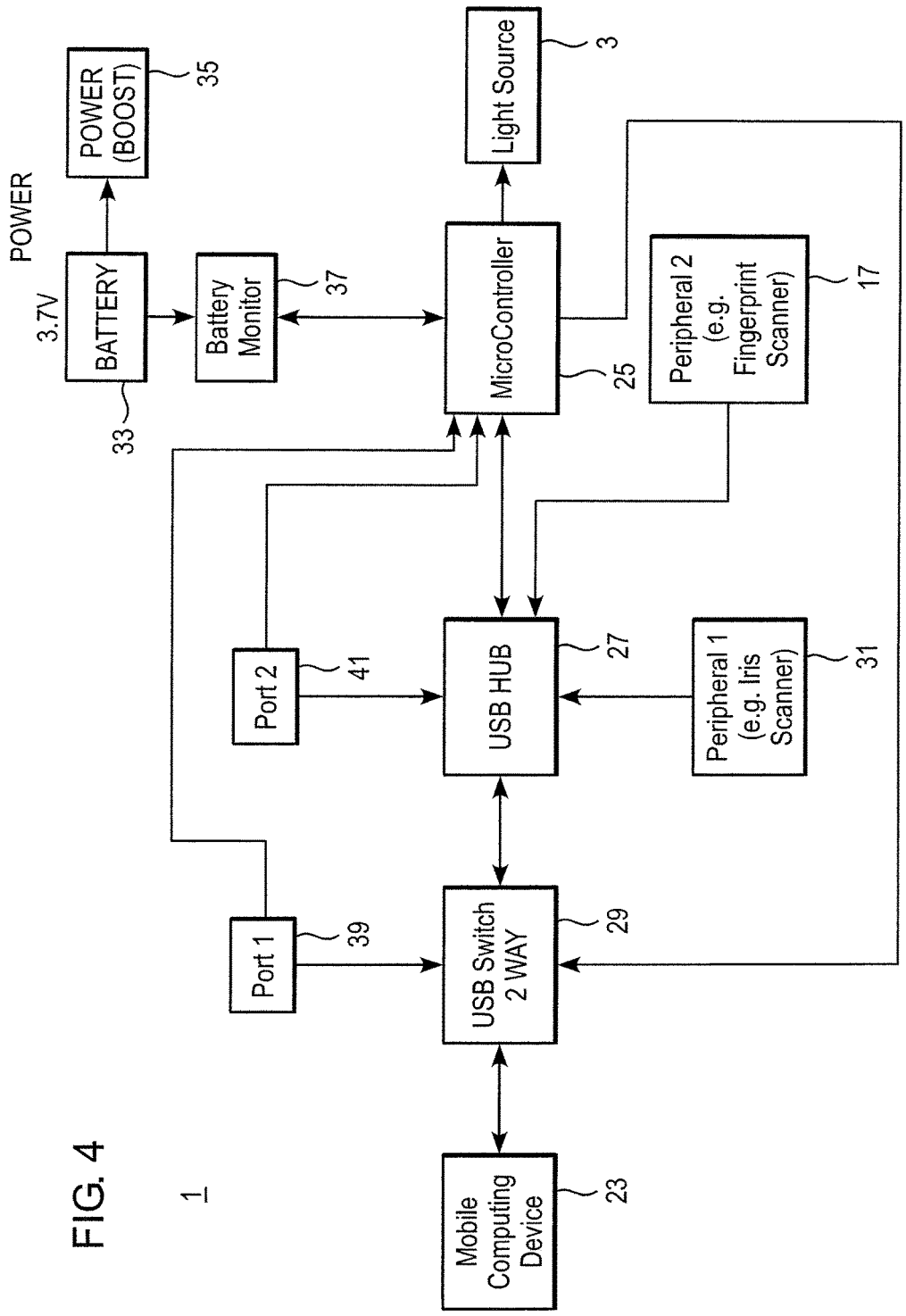
FIG. 4 is a block diagram illustrating the architecture of a handheld device accordance with an exemplary embodiment.
Figure 5:
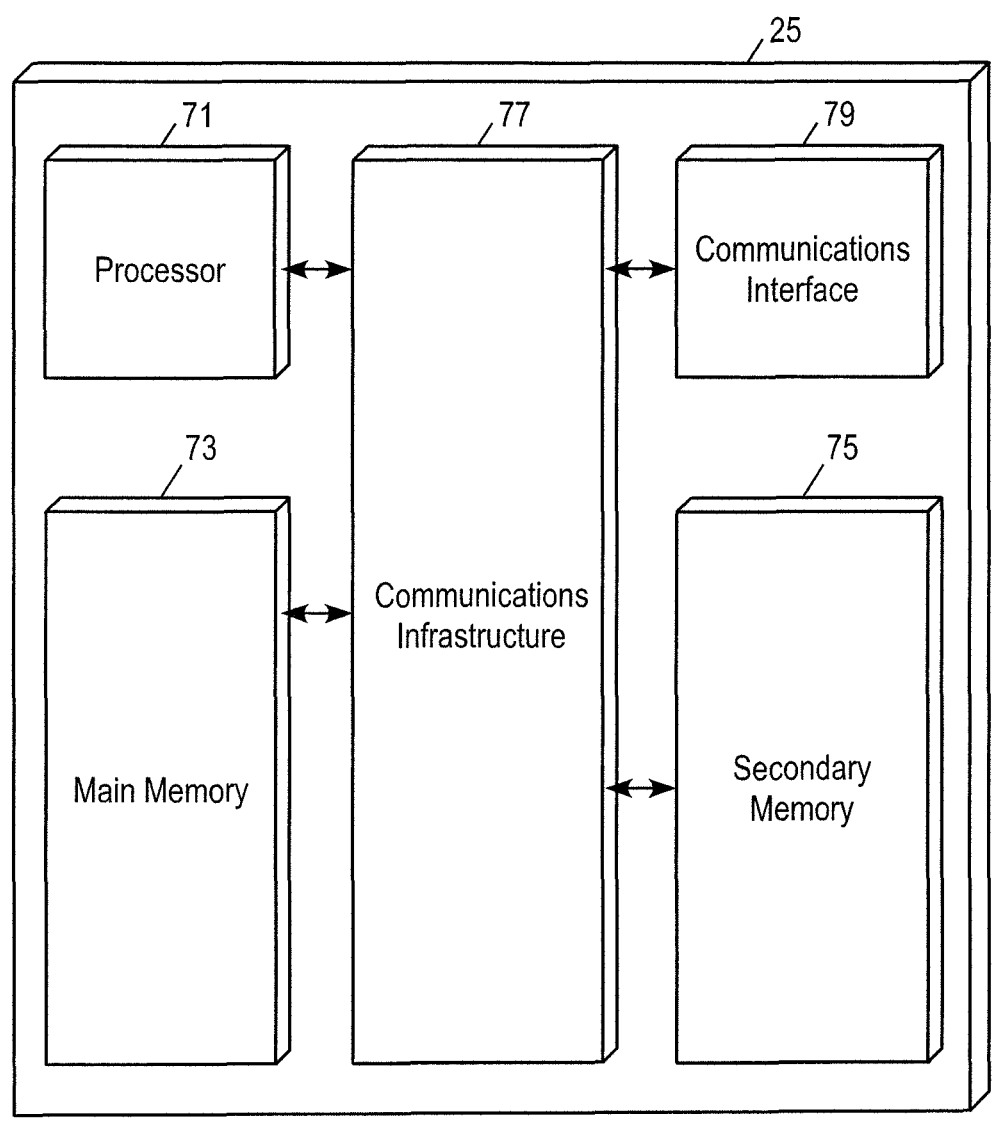
FIG. 5 is a block diagram illustrating the architecture of a processing unit of the handheld device accordance with an exemplary embodiment.

FIG. 4 illustrates an exemplary hardware architecture of the handheld device 1. Inside the housing 5 of the handheld device 1, there is a mobile computing device 23 such as a smartphone, tablet, etc. According to an exemplary embodiment, the mobile computing device 23 may contain the standard hardware components of a typical mobile computing device, e.g., digital camera 21, microphone, memory, on-board processor, display screen 21, etc. In an exemplary embodiment, the mobile computing device 23 is a Samsung Galaxy S5 smartphone. It is to be understood that the present disclosure is not limited to utilizing a commercially available mobile computing device such as a Samsung Galaxy mobile phone. An application specific mobile computing device 23 may alternatively be comprised in the handheld device 1 with the operative functions of the mobile computing device 23 as described herein. A USB switch 29 (which can be a two-way switch) is connected to the mobile computing device 23 as shown in FIG. 4. The USB switch 23 is connected to a port 39, a USB hub 27, and a microcontroller 25. The architecture of the microcontroller 25 is shown in FIG. 5 and will be discussed in detail later. The port 39 is a communications port that allows for the importing or exporting of data. In an exemplary embodiment, USB hub 27 allows the mobile computing device 23 to communicate with port 41, iris scanner 31, fingerprint scanner 17, and processing unit 25 simultaneously. The port 41, iris scanner 31, fingerprint scanner 17, and processing unit 25 are USB based. In FIG. 4, the light source 3 is connected to the processing unit 25. Also, a battery 33 (which is a distinct battery from the battery in the mobile computing device 23) is connected to the microcontroller 25 via a battery monitor 37. In an exemplary embodiment, the battery 33 is a lithium ion battery which has a voltage of, for example, 3.7 V. The battery can be stored in battery storage compartment 69 shown in FIG. 19B. The battery 33 can be connected to power boost unit 35 that includes one or more boost converters that take the voltage of the battery 33 and step it up to required voltages for the components of the handheld device 1 (e.g., processing unit 25, iris scanner 31, fingerprint scanner 31, etc.). FIG. 23 shows an exemplary iris scanner 31 used to scan the iris of a human eye. In FIG. 23, the scanner 31 is a removable attachment. The iris scanner 31 can be attached to the housing 5 as shown in FIG. 24.

FIG. 5 shows an exemplary embodiment of the architecture of the processing unit 25 (e.g., microcontroller) of the handheld device 1. A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A hardware processor device 71 as discussed herein may be a single hardware processor, a plurality of hardware processors, or combinations thereof. Hardware processor devices may have one or more processor "cores." The terms "computer program medium," "non-transitory computer readable medium," and "computer usable medium" as discussed herein are used to generally refer to tangible media such as a memory device 73, and a memory device 75.

Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor 71 may be a special purpose or a general purpose hardware processor device. The processor 71 may be connected to a communication infrastructure 77, such as a bus, message queue, network, multi-core message-passing scheme, etc. The network 67 may be any network suitable for performing the functions as disclosed herein and may include a local area network (LAN), a wide area network (WAN), a wireless network (e.g., Wi-Fi), a mobile communication network, a satellite network, the Internet, fiber optic, coaxial cable, infrared, radio frequency (RF), or any combination thereof. Other suitable network types and configurations will be apparent to persons having skill in the relevant art. The processing unit 25 may also include a memory 73 (e.g., random access memory, read-only memory, etc.), and may also include a memory 75. The memory 73 and the memory 75 may be read from and/or written to in a well-known manner. In an embodiment, the memory 73 and the memory 75 may be non-transitory computer readable recording media.

Data stored in the processing unit 25 (e.g., in the memory 73 and the memory 75) may be stored on any type of suitable computer readable media, such as optical storage (e.g., a compact disc, digital versatile disc, Blu-ray disc, etc.), magnetic tape storage (e.g., a hard disk drive), or solid-state drive. An operating system can be stored in the memory 73 or 75.

In an exemplary embodiment, the data may be configured in any type of suitable database configuration, such as a relational database, a structured query language (SQL) database, a distributed database, an object database, etc. Suitable configurations and storage types will be apparent to persons having skill in the relevant art.

The processing unit 25 may also include a communications interface 79. The communications interface 79 may be configured to allow software and data to be transferred between the processing unit 25 and external devices. Exemplary communications interfaces 79 may include a modem, a network interface (e.g., an Ethernet card), a communications port, a PCMCIA slot and card, etc. Software and data transferred via the communications interface 77 may be in the form of signals, which may be electronic, electromagnetic, optical, or other signals as will be apparent to persons having skill in the relevant art. The signals may travel via a communications path, which may be configured to carry the signals and may be implemented using wire, cable, fiber optics, a phone line, a cellular phone link, a radio frequency link, etc.

Computer program medium and computer usable medium may refer to memories, such as the memory 73 and the memory 75, which may be memory semiconductors (e.g., DRAMs, etc.). These computer program products may be means for providing software to the handheld device 1. Computer programs (e.g., computer control logic) may be stored in the memory 73 and/or the memory 75. Computer programs may also be received via the communications interface 79. Such computer programs, when executed, may enable handheld device 1 to implement the present methods as discussed herein. In particular, the computer programs, when executed, may enable processing unit 25 to implement the methods illustrated by FIGS. 10 and 25, or similar methods, as discussed herein. Accordingly, such computer programs may represent controllers of the handheld device 1. Where the present disclosure is implemented using software, the software may be stored in a computer program product or non-transitory computer readable medium and loaded into the handheld device using a removable storage drive or communications interface 79.

Figure 6:
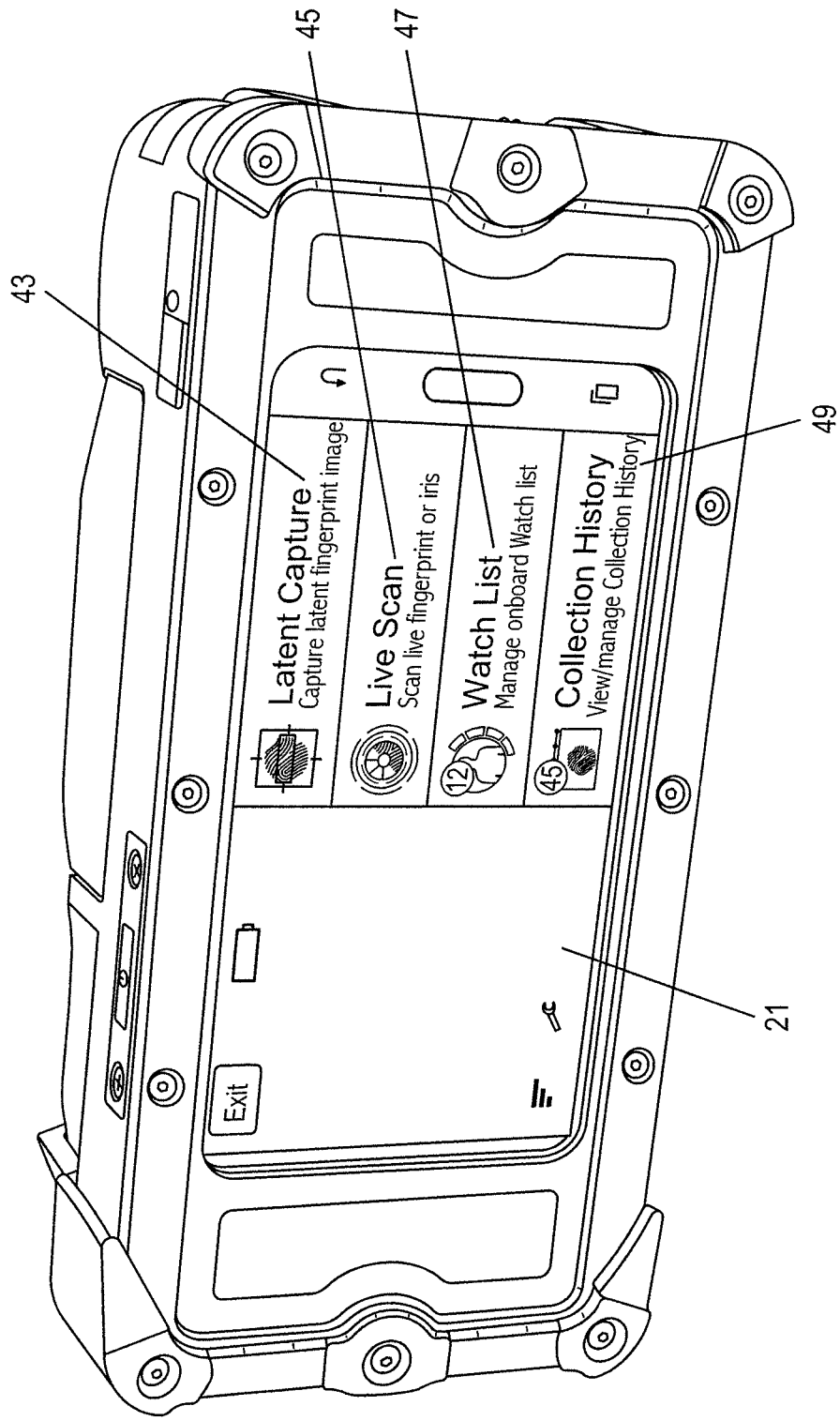
FIG. 6 illustrates a back view of a handheld device that may be employed in accordance with an exemplary embodiment.

FIG. 6 shows an exemplary menu in which a user can touch the display screen 21 to select a function to be performed by the handheld device 1. For example, the user can select the latent capture icon 43, and then the handheld device 1 operates to capture a latent fingerprint image in accordance with the operative features of the present disclosure as described herein. If the live scan icon 45 is selected, a live fingerprint scan can be performed using the fingerprint scanner 17. If the watch list icon 47 is selected, the watch list 61 shown in FIG. 7 can be managed. The watch list 61 can include the forensic records (e.g., fingerprint records) of people of interest. If the collection history icon 49 is selected, latent images and other information collected by the handheld device 1 can be reviewed.

The processing unit 25 is also configured to scale the generated first image to a predetermined format suitable for forensic analysis, and generate a second image of the forensic input in which the first image is scaled to the predetermined format, record the second image of the forensic input in the memory unit (e.g., memory 73, 75), compare the second image with forensic records, where each forensic record respectively includes previously collected forensic data associated with one or more individuals or specimens, and determine whether the second image matches at least a portion of at least one of the forensic records based on the comparison. Upon determining that the second image matches at least a portion of at least one of the forensic records, the processing unit 25 is configured to generate a matching notification 51 (see, e.g., FIGS. 7 and 8) identifying the at least one record which the second image is determined to match, and output the generated matching notification 51 on the device 1.

In an exemplary embodiment, the forensic input is a latent fingerprint, and the input unit 3 includes: a laser light source 7 configured to output at least two parallel laser lights on a surface of an object that includes the latent fingerprint at the scene of forensic analysis, the at least two laser lights being output toward respectively different positions on the surface of the object, and a camera 11 configured to generate the first image of the latent fingerprint that shows the at least two laser lights positioned on the surface of the object. The processing unit 25 is configured to determine at least one scaling dimension of the latent fingerprint on the surface of the object contained in the first image based on a first positional relationship between the at least two laser lights output on the surface of the object and a second positional relationship between two points of interest in the first image.

In an exemplary embodiment, the processing unit 25 is configured to determine the scaling dimension of the latent fingerprint by measuring a distance between the different positions of the at least two laser lights on the surface of the object, determining an angle of the at least two laser lights with respect to the surface of the object, and determining a distance between the two points of interest in the second image. In an exemplary embodiment, a motion sensor in the handheld device detects the orientation of the handheld device and is used to determine the angle of the at least two laser lights. In an exemplary embodiment, there can be at least two sets of lasers, each set of lasers having a different wavelength (e.g., color), and each set of lasers is used to measure different characteristics of the object and/or the surface of the object in the image. In an exemplary embodiment, the set of lasers are not parallel to each other and can be diverging or converging.

In an exemplary embodiment, the processing unit 25 is configured to scale the second image of the latent fingerprint to the predetermined format by modifying dimensions (e.g., height, width, etc.) of the latent fingerprint in the first image based on the determined scaling dimension of the latent fingerprint.

In an exemplary embodiment, the processing unit 25 is configured to identify portions of the second image that are external to the latent fingerprint in the second image, and crop out portions of the second image that are identified to be external to the latent fingerprint. In an exemplary embodiment, the processing unit 25 is configured to receive a selected area of the second image that includes the latent fingerprint, and determine that any area of the second image outside the selected area constitutes a portion of the second image that is external to the latent fingerprint. The selected area that is received can be input by a user of the handheld device drawing a line with their finger on the touchscreen 21 of the device around the fingerprint or region of interest in order to exclude areas outside of the line around the fingerprint from being analyzed and/or image processed.

In an exemplary embodiment, the processing unit 25 is configured to at least one of: filter out at least one of high and low frequency data from the second image using an adjustable spectral filter, filter out data from the second image using an adjustable spatial filter, and enhance the contrast of the latent fingerprint in the second image. FIGS. 11-14 show examples of the processing unit 25 performing contrast enhancement (e.g., darkening of the fingerprint lines, etc.) and filtering out high and low frequency data (e.g., unwanted data such as noise, etc.).

According to an exemplary embodiment (see FIGS. 11-14), the handheld device 1 of the present disclosure utilizes a five step image processing algorithm (performed by the processing unit 25) for latent fingerprint image processing, as follows:

Step (1): user selects region of interest (ROI) for mask from a latent image.

Step (2): contrast-enhance and smooth latent image.

Step (3): band-pass filter
   Filter out high frequency data (e.g., noise)
   Filter out low frequency data (e.g., large objects, smudges, background)
   Amplify patterns in spatial frequency range of fingerprints (possibly including small text and lines as well)

Step (4): break-up image into small regions (e.g., 32×32 pixels that overlap).
   Power spectrum enhancement (amplifies dominant pattern in that local region)
   Rescale grayscale range for that local region
   Replace center 16×16 pixels in image Step (5): apply mask.

Figure 11:
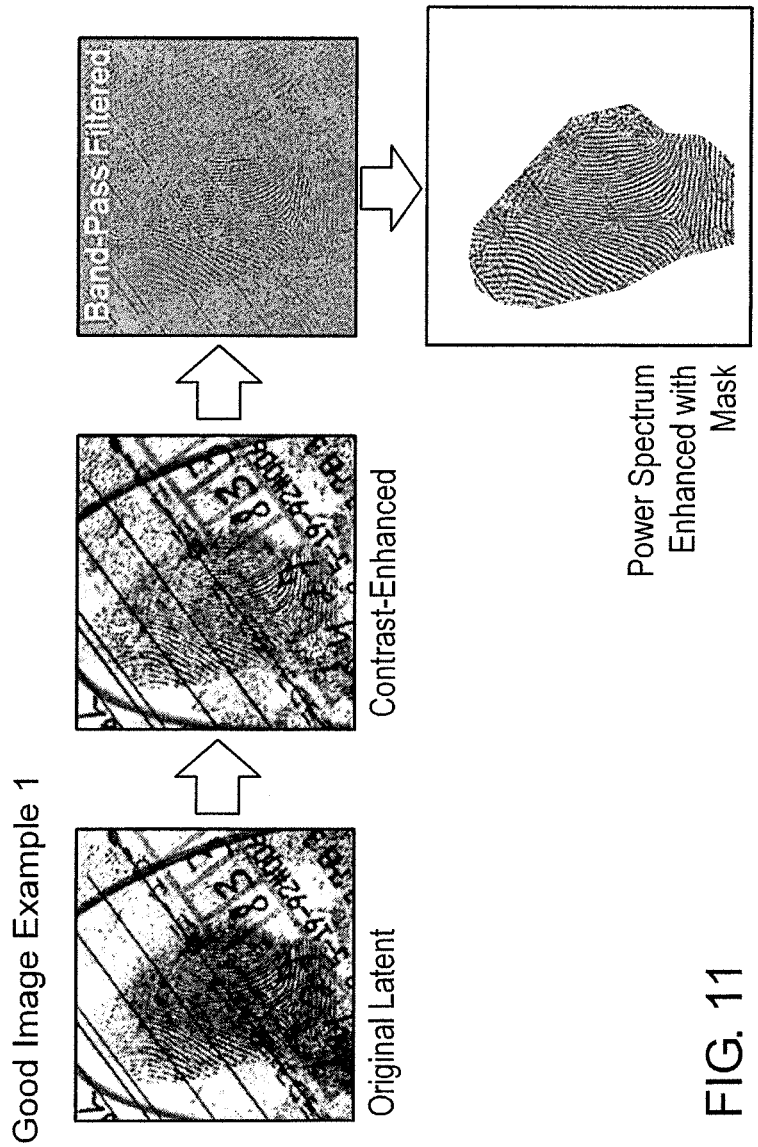
FIG. 11 illustrates image processing that may be employed by the handheld device in accordance with an exemplary embodiment.
Figure 12:
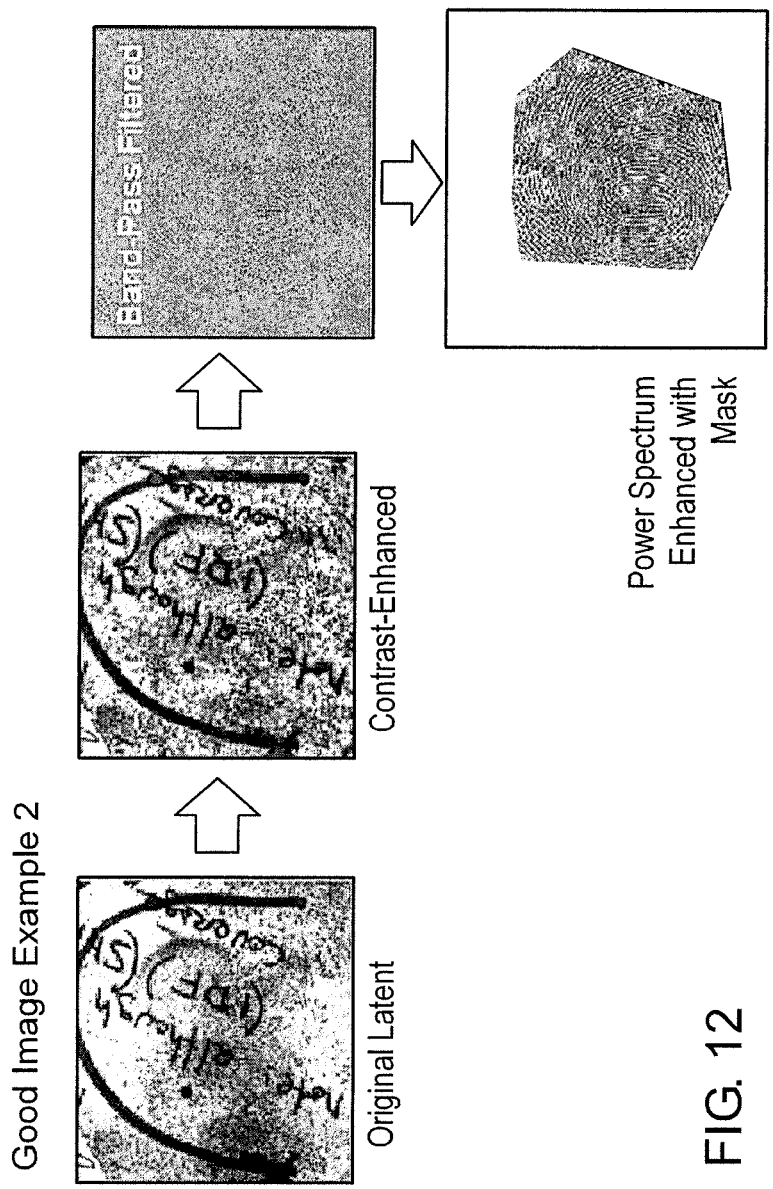
FIG. 12 illustrates image processing that may be employed by the handheld device in accordance with an exemplary embodiment.
Figure 13:
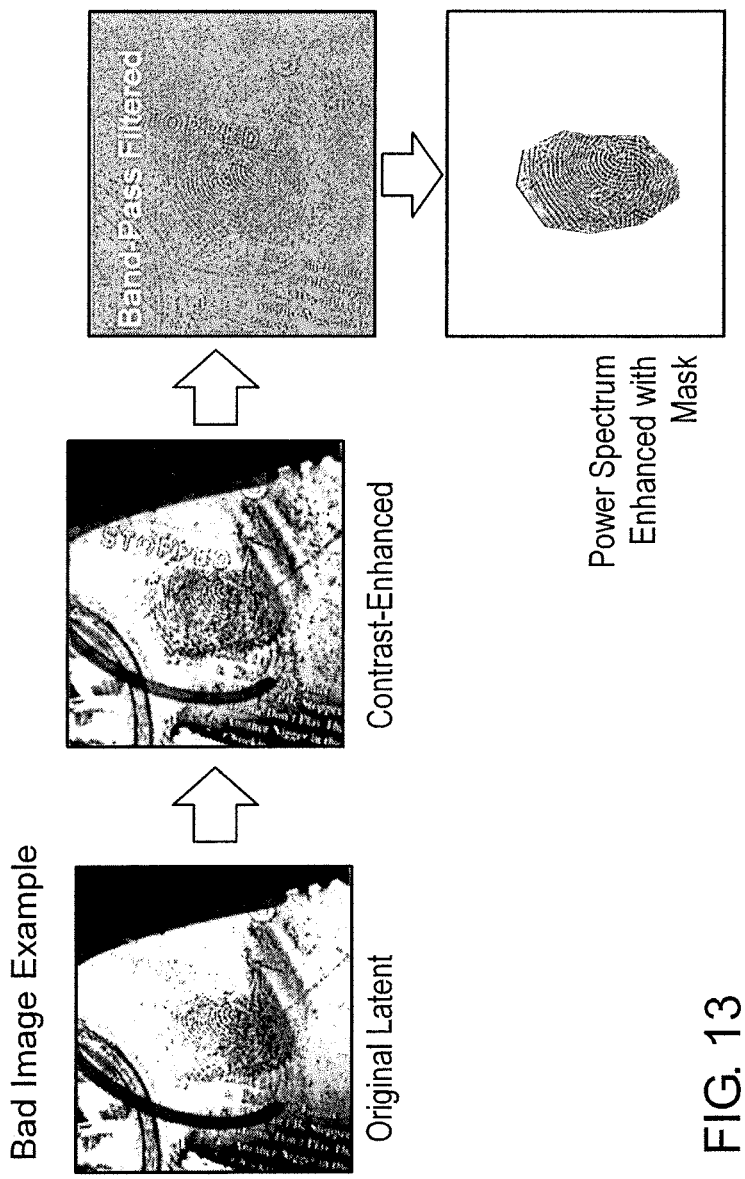
FIG. 13 illustrates image processing that may be employed by the handheld device in accordance with an exemplary embodiment.
Figure 14:
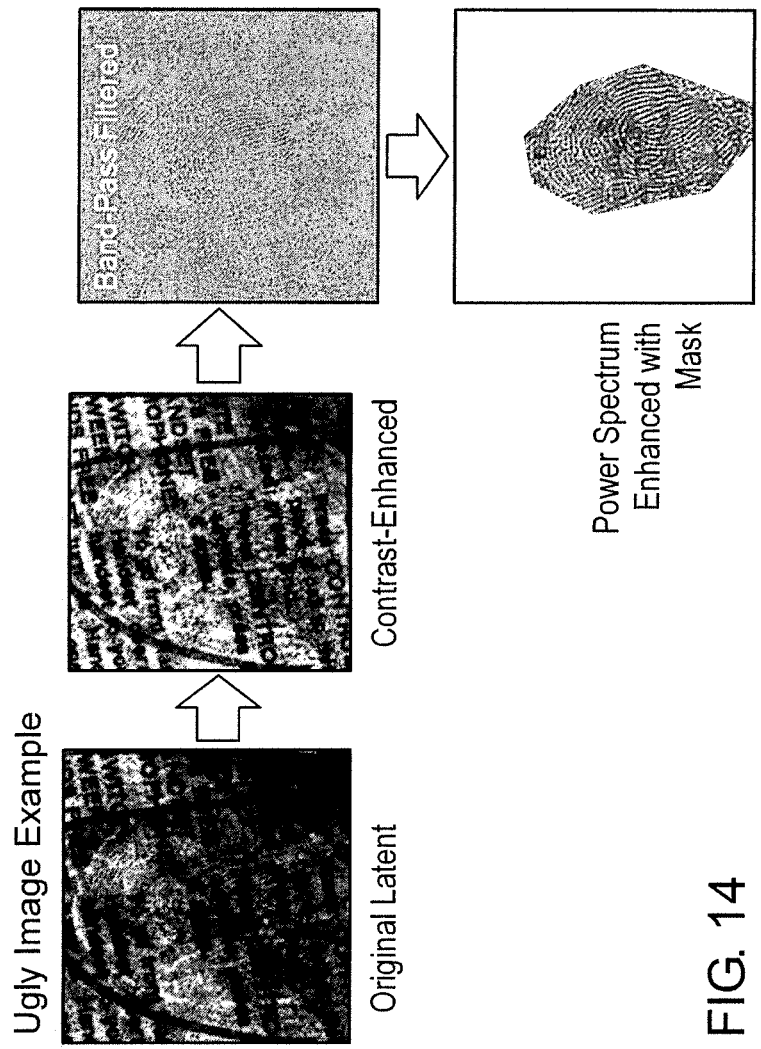
FIG. 14 illustrates image processing that may be employed by the handheld device in accordance with an exemplary embodiment.

FIG. 11 is a representation of a good image example using the image processing algorithm for latent image processing of the present disclosure. FIG. 12 is a representation of another good image example. FIGS. 13 and 14 are each representations of a bad image example using the image processing algorithm for latent image processing according to the present disclosure.

Figure 10A:
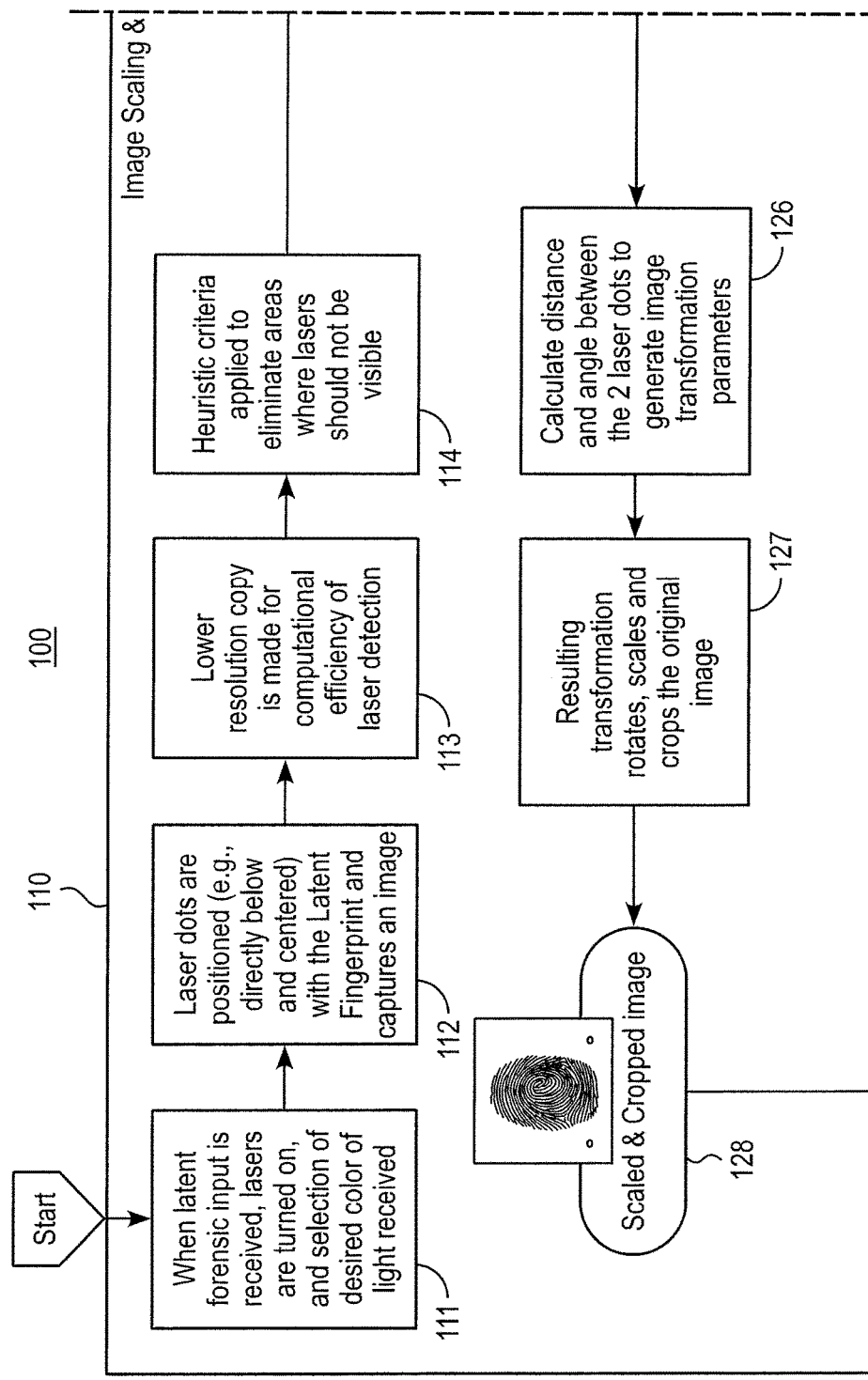
FIG. 10 is a flow chart illustrating a method according to an exemplary embodiment.
Figure 10A:
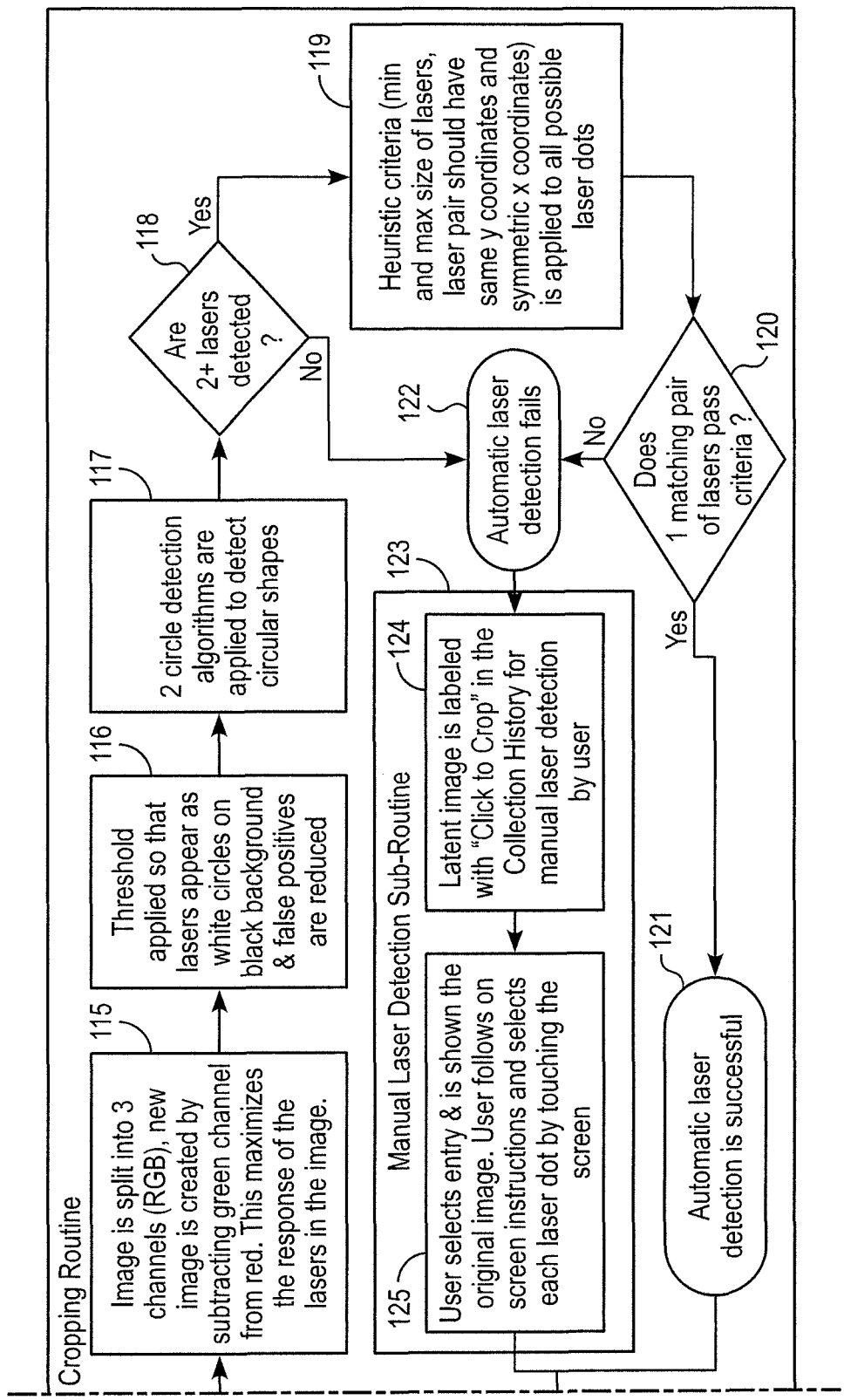

FIGS. 10A-10O illustrate exemplary image processing methods that can be performed on an image captured by the handheld device 1. FIG. 10A illustrates an exemplary image scaling and cropping routine 110 that can be performed by the processing unit 25 of the handheld device 1. When a user wants to capture a latent forensic input, the user selects the latent capture icon 43 (shown in FIG. 6) on the display screen 21, the lasers 7 are turned on, and the user can select the desired color of light (emitted by one or more of the lights 9) they wish to use to capture an image of the forensic material with the camera 11. See step 111. In step 112, laser dots produced by the lasers 7 are positioned (e.g., directly below and centered) with the latent fingerprint or other forensic material, and the camera 11 captures an image (i.e., a first image) which includes the latent fingerprint and the laser dots in the frame of the image. In step 113, a lower resolution copy of the image is made for computational efficiency of the laser detection.

In step 114, heuristic criteria are applied to eliminate areas where the laser dots should not be visible. In step 115, the image is split into three channels (e.g., RGB), and a new image is created by subtracting the green channel (G) from the red channel (R). This step maximizes the response of the lasers in the image. In step 116, a threshold is applied so that the laser dots appear as white circles on a black background and false positives are reduced. In step 117, two circle detection algorithms are applied by the processing unit 25 to detect circular shapes (i.e., of the laser dots). In step 118, it is determined, by the processing unit 25, whether two or more laser dots are detected in the image. If the laser dots are not detected (step 122), automatic laser detection fails, and a manual laser detection sub-routine (steps 124 and 125) is then performed. If the laser dots are detected, step 119 is performed. In step 119, heuristic criteria (e.g., minimum and maximum size of lasers, lasers should have same y coordinates and symmetric x coordinates) is applied to all possible laser dots in the image.

In step 120, it is determined whether a matching pair of lasers passes the criteria. If not, automatic laser detection cannot be performed, and the manual laser detection sub-routine will need to be performed. If a matching pair of lasers passes the criteria, the automatic laser detection method performed by the processing unit 25 is successful (step 121).

When automatic laser detection fails, a manual laser detection sub-routine (steps 124 and 125) is then performed. In step 124, a latent image (that can be accessed by touching collection history icon 49 in FIG. 6) is labeled with "Click to Crop" in the "Collection History" menu. When a user selects the latent image labeled with Click to Crop," the original latent image is shown on the display screen 21. On screen instructions are displayed in which the user follows to select each laser dot in the image by touching the display screen 21 (step 125).

In step 126, the processing unit 25 calculates the distance and angle between the two laser dots to generate image transformation parameters. In step 127, the resulting transformation rotates, scales, and crops the original image. This results in a scaled and cropped image (step 128).

Figure 10B:
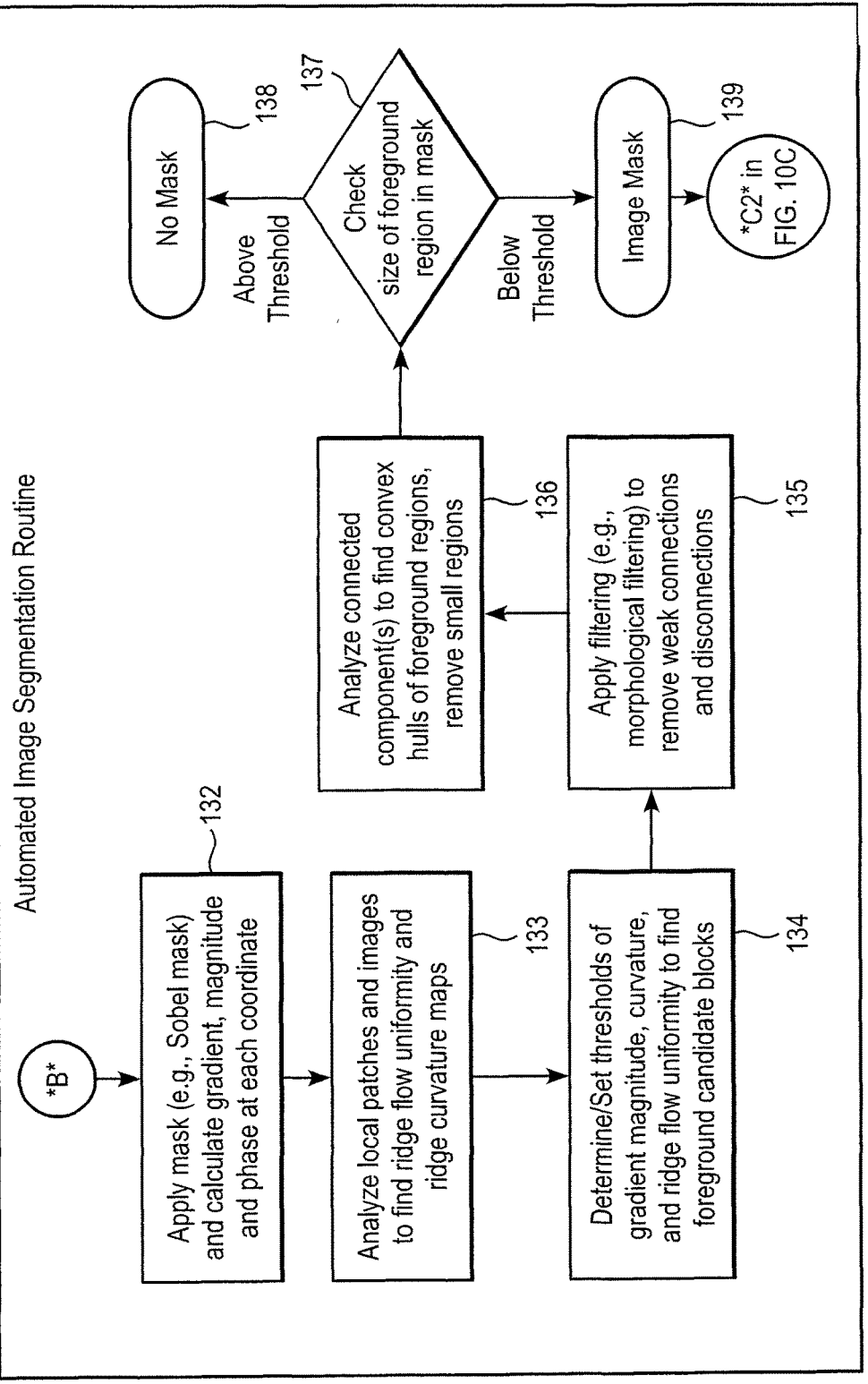

In FIG. 10B, the scaled and cropped image from FIG. 10A is used in automated image segmentation routine 130. The scaled and cropped image is used in step 132. In step 132, a mask is applied (e.g., a Sobel mask), and a gradient, magnitude, and phase at each coordinate is calculated. In step 133, local patches of the image are analyzed to find ridge flow uniformity and ridge curvature maps. In step 134, gradient magnitude, curvature, ridge flow uniformity thresholding are applied to find foreground candidate blocks. In step 135, morphological filtering is applied to remove weak connections and disconnections. In step 136, connected component analysis is performed to find convex hulls of foreground regions, and small regions are removed. In step 137, the size of the foreground region in the mask is determined. If the size of the foreground region is above a threshold (e.g., a predetermined value) an image mask is not applied (step 138). If the size of the foreground region in the mask is below a threshold (which may or may not be the same as the previous threshold) an image mask is applied (step 139).

Figure 10C:
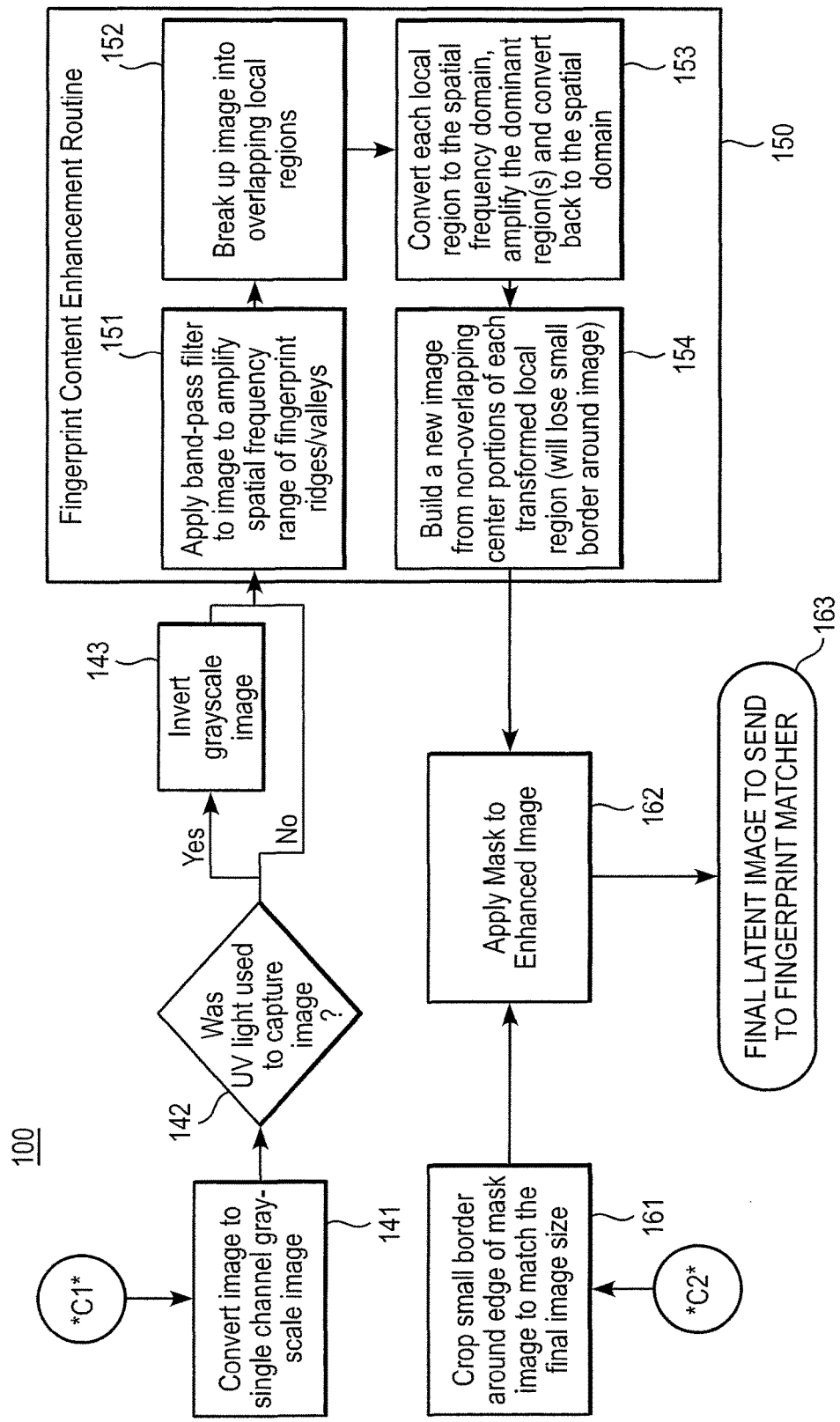

In FIG. 10C, the scaled and cropped image from FIG. 10A is used. In step 141, the scaled and cropped image is converted to a single channel grayscale image. In step 142, it is determined whether UV light was used to capture the image. If yes, the grayscale image is inverted in step 143, if no, the process proceeds to fingerprint content enhancement routine 150.

The fingerprint content enhancement routine 150 includes steps 151, 152, 153, and 154. In step 151, a band-pass filter is applied to the image to amplify the spatial frequency range of fingerprint ridges/valleys. In step 152, the image is broken up into overlapping local regions. In step 153, the processing unit 25 converts each local region to the spatial frequency domain, amplifies the dominant region(s), and converts the regions back to the spatial domain. In step 154, a new image is built from non-overlapping center portions of each transformed local region.

Step 161 uses the image mask of FIG. 10B, and crops a small border around the edge of the mask image to match the final image size. In step 162, the mask from step 161 is applied to the enhanced image of step 154 to produce the final latent image. In step 163, the final latent image is sent to the fingerprint matcher so that it can be compared against forensic records.

FIGS. 1-3, 18A, 18B, 20A, 20B, 20C, 21A, 21B, 21C, and 24 illustrate an exemplary embodiment of the handheld device 1 which includes integrated lasers 7 for automated image scaling and latent capture light sources 9. By using integrated laser sources 7 that appear in captured images, the on-board processor 71 of the handheld device 1 automatically detects the lasers in the digital image and automatically converts the image to the required image resolution for fingerprint recognition and for standards-compliant exportation to an external database (e.g., central command 63 and/or central data repository 65).

This precludes the need for human operator to place a ruler in the image. It also precludes the need for a human operator to manually input the scale/size of the image/fingerprint, and allows the user to capture an image at a range of distances instead of one specific distance between the camera and the object. The present disclosure can utilize the features of image scaling from parallel lasers as disclosed in U.S. Pat. No. 6,891,148, the entire disclosure of which is hereby referenced in its entirety, and which is included herein as part of the specification of the present application.

According to an exemplary embodiment, the handheld device 1 of the present disclosure provides a unique mechanism used to build, manufacture, constrain, and adjust the laser light separation distance. The handheld device 1 of the present disclosure provides a combination of the laser light sources 7 and the automated image processing algorithm to rescale the image.

Using these techniques for fingerprint recognition, a particular advantage is unconstrained distance between the device 1 and the imaged surface.

According to an exemplary embodiment, the latent fingerprint imaging/recognition component of the handheld device 1 includes an attachment point for external lens, optics, or other devices specifically designed to improve latent fingerprint or forensic evidence processing (see FIG. 3).

According to an exemplary embodiment, the handheld device 1 uses laser lights 7 to 1) "frame" the latent fingerprint and to 2) scale the image. By using the laser lights to position the fingerprint in the image, this allows the image processing algorithms to detect and separate the latent fingerprint image from other parts of the digital image.

In addition, the handheld device 1 of the present disclosure provides a software-based user interface to allow the human operator to properly size/scale the digital latent fingerprint image when the laser measurement system cannot be used (e.g., mirrored surfaces, highly reflective surfaces, etc.). In an exemplary embodiment, the operator interface 21 (e.g., touchscreen) is configured to receive a dimension (e.g., distance from the handheld device to the fingerprint, height of fingerprint, width of fingerprint, etc.) associated with the latent fingerprint. In an exemplary embodiment, the processing unit 25 is configured to determine a scaling dimension of the fingerprint on the surface of the object contained in the first image based on the received dimension.

According to an exemplary embodiment, the processing unit 25 of the handheld device 1 of the present disclosure is configured to enhance and isolate latent fingerprint images. The processing unit 25 is configured to execute custom-designed algorithms to identify, isolate, and enhance the fingerprint content of dusted latent fingerprint images. This improves fingerprint recognition performance.

In an exemplary embodiment, the handheld device 1 includes at least one light source 9 configured to output light of different colors toward a surface of an object at the scene of forensic analysis. With reference to FIGS. 1-3, the handheld device 1 includes integrated light sources 9, including red, green, blue, white, and ultraviolet, to provide various forensic detection and collection capabilities.

In an exemplary embodiment, the handheld device 1 includes an operator interface 21 (e.g., touchscreen) configured to receive operator instructions regarding a selection of at least one of a color and an intensity of the selected at least one color to be output from the at least one light source 9. In an exemplary embodiment, the plurality of light sources 9 are each configured to output light of a predetermined color (e.g., red, green, and/or blue) toward a surface an object at the scene of forensic analysis. The operator interface 21 is configured to receive operator instructions regarding a selection of at least one of the plurality of light sources 9 to output the predetermined color of the selected at least one of the light sources 9 on the surface of the object at the scene of forensic analysis. Thus, the handheld device 1 allows the user to select the forensic light source 9 via operator interface 21 and allows the user to adjust the light intensity of each light source 9. This precludes the need to carry external forensic-quality lighting devices. The handheld device 1 of the present disclosure therefore provides a combination of integrated light sources 9 plus the feature of laser scaling described above. The handheld device 1 of the present disclosure also provides a mechanism for adjusting laser light intensity via on-screen interface 21, to improve the ability of the device 1 to image latent fingerprints from different surfaces.

In an exemplary embodiment, the forensic records are recorded in the memory unit. For example, the memory unit can be main memory 73 or secondary memory 75 in the microcontroller 25 of the handheld device (shown in FIG. 5).

In an exemplary embodiment, the handheld device includes a connection interface configured to receive the forensic records. In an exemplary embodiment, the connection interface is a data port (e.g., port 15, port 39, and port 41) in the housing 5 of the handheld device configured to receive a wired connection to a computer 65 to receive the forensic records. The data port can be a USB port, thunderbolt port, firewire port, or any other data port.

In an exemplary embodiment, the connection interface is a transceiver configured to receive the forensic records via a wireless transmission. For example, the transceiver can be an antenna of the mobile computing device 21 or an antenna that is separate from the mobile computing device 21. The antenna can receive data that is transmitted wirelessly, for example, over a cellular network, Wi-Fi, Bluetooth, etc. In an exemplary embodiment, the processing unit 25 is configured to record the received forensic records in the memory unit (e.g., the main memory 73 or secondary memory 75). In an exemplary embodiment, the forensic records are received from a law enforcement database 65.

Figure 7:
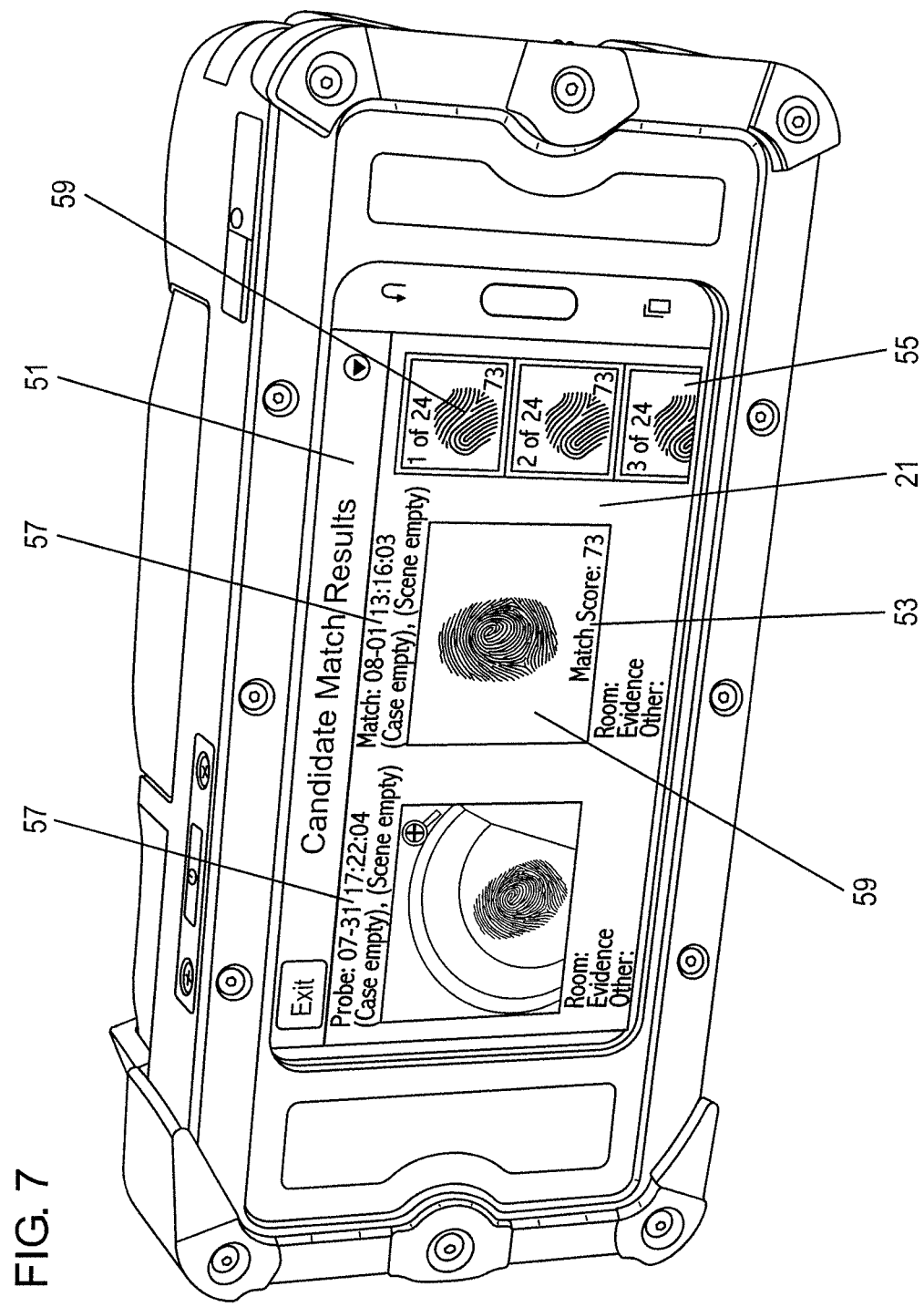
FIG. 7 illustrates a back view of a handheld device that may be employed in accordance with an exemplary embodiment.
Figure 8:
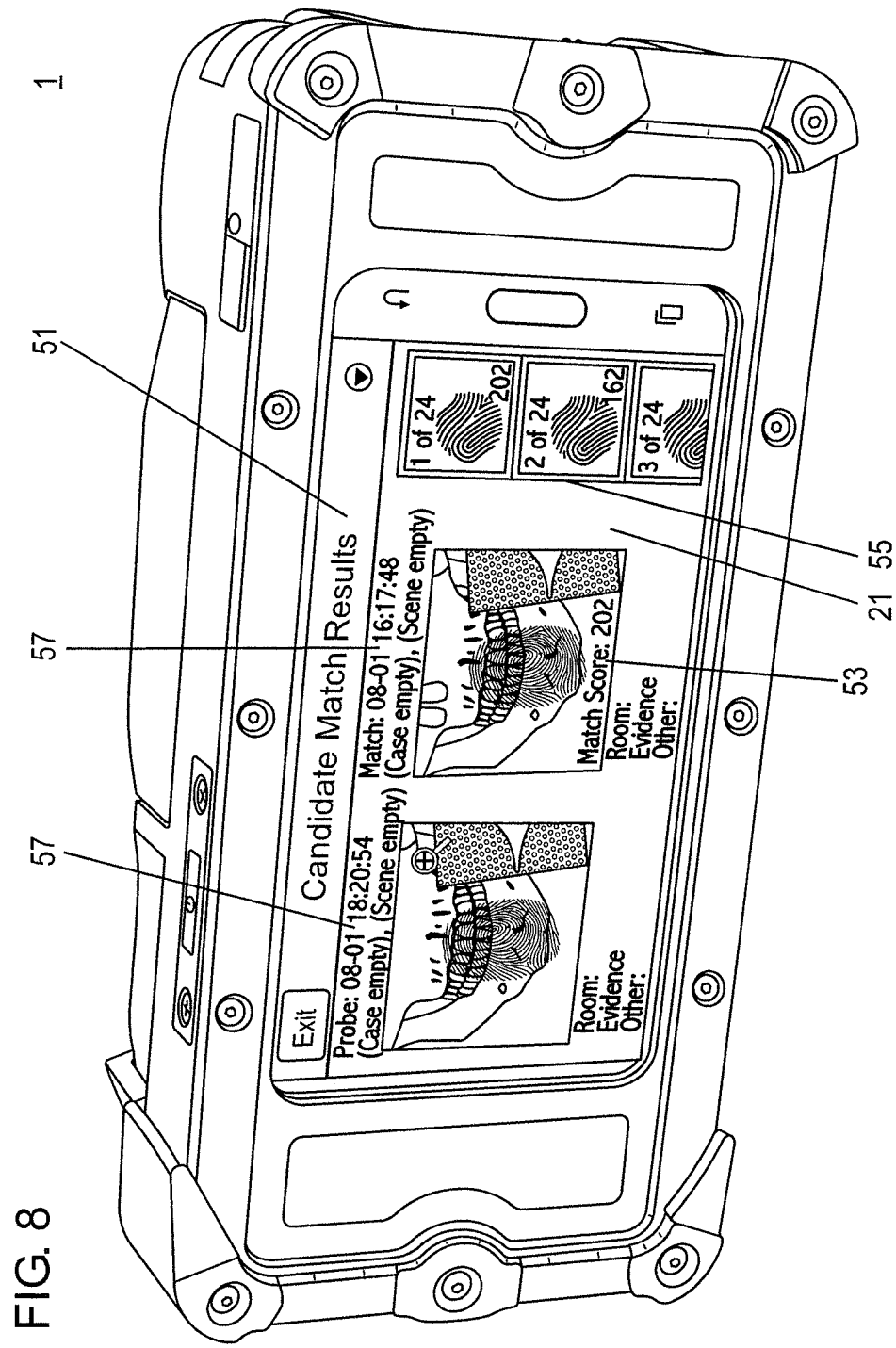
FIG. 8 illustrates a back view of a handheld device that may be employed in accordance with an exemplary embodiment.

In an exemplary embodiment, the processing unit 25 is configured to associate identification information 57 with the second image. For example, the identification information 57 can include at least one identifying attribute about at least one of the forensic input (e.g., a user description of the forensic input), the scene of forensic analysis (e.g., descriptions about the location and/or ambient conditions of the scene of forensic analysis), a time and/or date the first image was generated, and an identification of an operator of the device 1. FIGS. 7 and 8 show exemplary identification information 57. In FIGS. 7 and 8, the identification information 57 on the left side of the display screen 21 is the date and time a latent fingerprint was captured by the handheld device (e.g., the time the image was taken, the time has completed image processing, etc.). In FIGS. 7 and 8, the identification information 57 on the right side of the display screen 21 is the date and time a match has been made with the latent fingerprint displayed on the screen and a stored fingerprint record. In an exemplary embodiment, the identification information 57 on the right side of the display screen 21 can be the date the stored fingerprint record was obtained (e.g., date the handheld device 1 received the record or date the fingerprint record was obtained from the individual).

According to an exemplary embodiment, the device 1 includes a display device 21 (shown in FIG. 7), and the processing unit 25 is configured to control the display device 21 to display the generated matching notification 51. The matching notification 51 includes an image of the at least one record 59 which the second image (shown on the left side of display 21 in FIG. 7) is determined to match (shown in the center of display 21 in FIG. 7) and a quality of match indicator 53 that indicates how close the match is between the second image and the at least one record 59. In an exemplary embodiment, the match indicator 53 is a score from 0 to 100, and the higher the score, the better the match is. However, the match indicator 53 is not limited to a number, and could be, for example, a letter grade, an icon that is displayed, etc. FIG. 7 also shows a candidate match results area 55 that lists potential matches and their corresponding quality of match indicator 53.

According to an exemplary embodiment, the input unit is configured to receive a plurality of forensic inputs at the scene of forensic analysis, and the processing unit 25 is configured to analyze each of the forensic inputs.

According to an exemplary embodiment, the handheld device 1 of the present disclosure includes a slide out tray for an integrated, live fingerprint scanner 17. The integrated fingerprint scanner 17 can be slid out during use and retracted back into the device 1 when not in use. Retracting the scanner 17 protects the scanner 17, keeps the device 1 water-proof and dust-proof, and reduces the form factor, allowing it to be easily carried and used with one hand.

FIGS. 17-22 illustrate exemplary features of the fingerprint tray design of the handheld device 1 according to the present disclosure. In the illustrated embodiment, the scanner module 17 is attached (e.g., bolted) into a custom drawer 83 (shown in FIG. 19C). Custom fingerprint casing is used to reduce the size and allow for in-field replacement of the tray. The scanner 17 retracts into the housing 5 of the handheld device 1 to protect the sensitive scanning surface 19 of the scanner 17 and to allow for easy transportation. FIG. 2 shows the scanner 17 in the extended position, and shows screws that attach the scanner module 17 to the drawer 83.

According to an exemplary embodiment shown in FIGS. 22A and 22B, the drawer 83 has two ball bearings 85 on each side (4 total) that attach to the drawer 83 via press-fit pin. In addition, there are two or more magnets 87 which press into the drawer 83 and four or more magnets 89 which press into the device frame. The drawer 83 with bearings 85 slides into precut rails on the front side of the device 1, for example. When the drawer 83 is inserted into the housing, the drawer 83 slides smoothly on the ball bearings 85 in tracks, and is held in the open and closed positions by the attraction of the magnets 87, 89.

According to an exemplary embodiment, the drawer design also provides a tethered electronics connection to ensure power and data communications at all drawer locations. Wired connectivity is provided between the scanner module 17 and device 1 by a flexible flat cable attached to a custom PCB with a pin-out that matches the spring pin layout on the bottom of the scanner module 17. A gasket around the PCB keeps connection rated to IP65. In addition, there is provided a custom fingerprint casing to allow wired connectivity and preserve IP-65 dust and water ingress protection certification.

According to an exemplary embodiment, the input unit includes a scanner 17 configured to obtain a representation of at least one of a fingerprint, a group of fingerprints, and an area of a hand, and the processing unit 25 is configured to generate the first image from the obtained representation.

According to an exemplary embodiment, the device includes a housing 5 having the memory unit 73, 75, the input unit 17, 31 and the processing unit 25 comprised therein. According to an exemplary embodiment shown in FIGS. 19B and 19C, the housing 5 comprises an opening 81, and the scanner 17 is configured to be secured within the opening 81 when not in use, and to be retractably extended from the opening for operation (see FIG. 2).

According to an exemplary embodiment shown in FIGS. 23 and 24, the device 1 includes an iris detection unit 31 configured to capture data regarding at least one iris of an eye and output the captured data to the processing unit 25.

According to an exemplary embodiment, a system includes a plurality of handheld devices 1 as shown in FIG. 15. Each of the handheld devices 1 respectively includes a transceiver configured to communicate with each other at the scene of forensic analysis. In FIG. 15, two handheld devices 1 can communicate with each other directly without using the network 67, i.e. by a local area network, Bluetooth, etc. In an exemplary embodiment, the transceiver of a first one of the handheld devices 1 is configured to transmit the second image to a second one of the handheld devices 1 with identification information 57 associated with the second image. The processing unit 25 of the second handheld device 1 is configured to record the second image in the memory unit 73, 75 of the second handheld device with the identification information 57 associated with the second image, and the identification information 57 includes at least one of a description of a location of the forensic input, an identity of an individual to whom the forensic input belongs, and a description of the scene of forensic analysis.

FIG. 15 also shows that the handheld devices 1 can communicate with each other over a network 67, and they can communicate with a central command 63 and/or a central data repository 65 over the network 67 or directly without the network 67. These features are also shown in FIG. 16.

Figure 25:
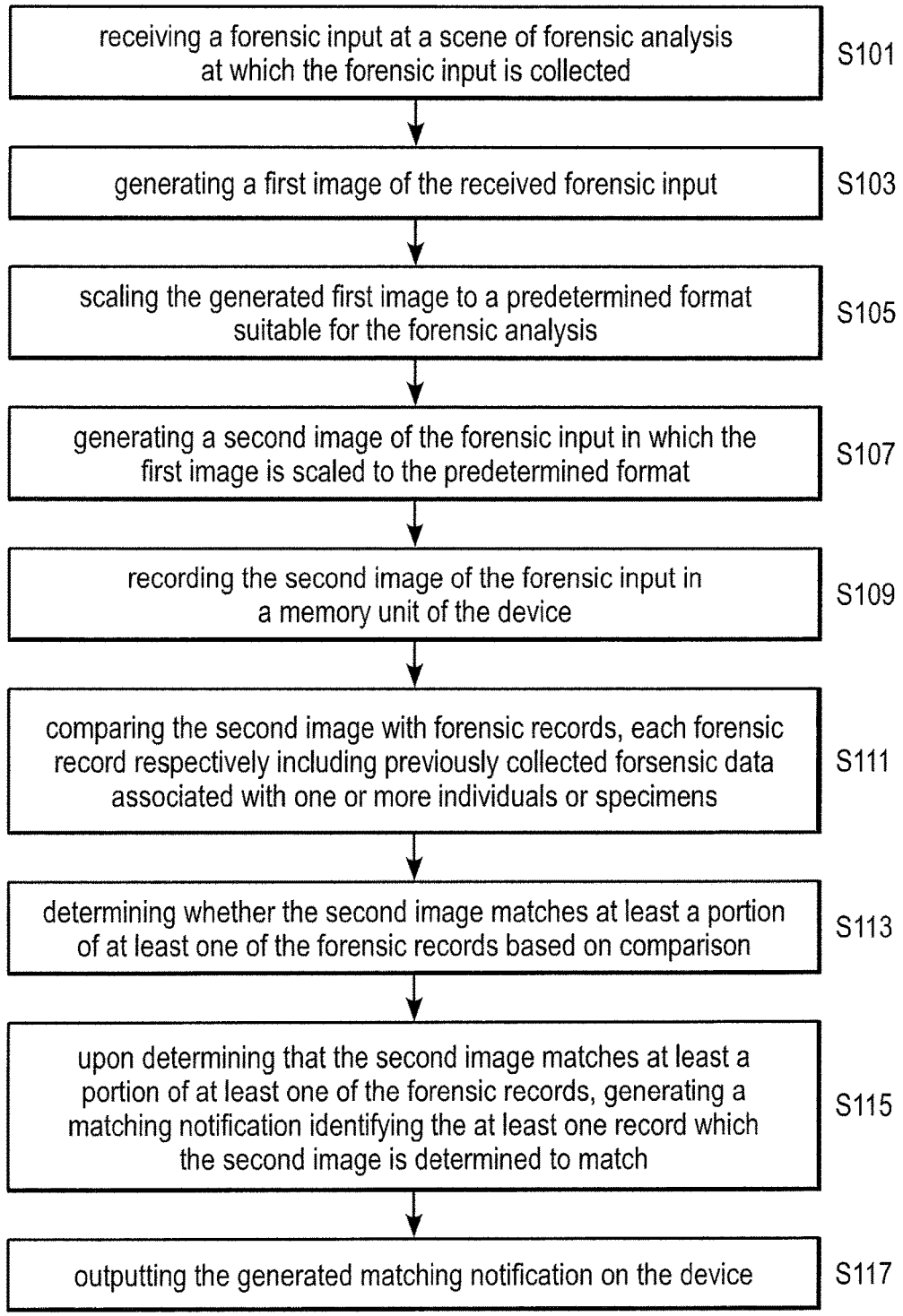
FIG. 25 is a flow chart illustrating a method according to an exemplary embodiment.

An exemplary method for forensic analysis using a portable, handheld device 1 is shown in FIG. 25. The method includes receiving, by an input unit (e.g., camera 11, scanner 17, iris scanner 31) of the device 1, a forensic input at a scene of forensic analysis at which the forensic input is collected (step S101). The method also includes generating, by a processing unit 25 of the device 1, a first image of the received forensic input (step S103), and scaling, by the processing unit 25, the generated first image to a predetermined format suitable for forensic analysis (step S105). Further, the method includes generating, by the processing unit 25, a second image of the forensic input in which the first image is scaled to the predetermined format (step S107), and recording, by the processing unit 25, the second image of the forensic input in a memory unit 73, 75 of the device 1 (step S109). It also includes comparing, by the processing unit 25, the second image with forensic records, each forensic record respectively including previously collected forensic data associated with one or more individuals or specimens (step S111). The method also includes determining, by the processing unit 25, whether the second image matches at least a portion of at least one of the forensic records based on the comparison (step S113). Upon determining that the second image matches at least a portion of at least one of the forensic records, generating, by the processing unit 25, a matching notification 51 identifying the at least one record which the second image is determined to match (step S115). The method also includes outputting, by the processing unit 25, the generated matching notification 51 on the device 1.

An exemplary embodiment includes a non-transitory computer-readable storage medium 73, 75 having computer-readable instructions tangibly recorded thereon which, when executed by a processing unit 25 of a portable handheld device 1 for forensic analysis, cause the processing unit 25 to perform a method for forensic analysis comprising: receiving a forensic input at a scene of forensic analysis at which the forensic input is collected; generating a first image of the received forensic input; scaling the generated first image to a predetermined format suitable for the forensic analysis; generating a second image of the forensic input in which the first image is scaled to the predetermined format; recording the second image of the forensic input in a memory unit 73, 75 of the device 1; comparing the second image with forensic records, each forensic record respectively including previously collected forensic data associated with one or more individuals or specimens; determining whether the second image matches at least a portion of at least one of the forensic records based on the comparison; upon determining that the second image matches at least a portion of at least one of the forensic records, generating a matching notification 51 identifying the at least one record which the second image is determined to match; and outputting the generated matching notification 51 on the device 1.

The above-described method can perform any of the operations of the handheld device 1 as described herein. Furthermore, the above-described non-transitory computer-readable storage medium of the handheld device 1 can store instructions which cause the hardware processor to perform the operative functions of the handheld device 1 as described herein.

While various exemplary embodiments of the disclosed device, system, and method have been described above, it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

As can be seen above, the device, method, and system can be implemented in any number of ways as discussed above, or as will become apparent to those skilled in the art after reading this disclosure. These embodiments, as well as variations and modifications thereof, which will occur to those skilled in the art, are encompassed by the disclosure. Hence, the scope of the device, system, and method for forensic analysis is limited only by the metes and bounds as articulated in the claims appended hereto.

What is claimed is:

1. A portable, handheld device for forensic analysis, the device comprising:
   a memory unit having an executable program recorded therein;
   an input unit configured to receive a forensic input at a scene of forensic analysis at which the forensic input is collected; and
   a processing unit configured to, by executing the program recorded in the memory unit at the scene of forensic analysis,
   generate a first image of the received forensic input,
   scale the generated first image to a predetermined format suitable for forensic analysis, and generate a second image of the forensic input in which the first image is scaled to the predetermined format,
   record the second image of the forensic input in the memory unit,
   compare the second image with forensic records, each forensic record respectively including previously collected forensic data associated with one or more individuals or specimens,
   determine whether the second image matches at least a portion of at least one of the forensic records based on the comparison,
   upon determining that the second image matches at least a portion of at least one of the forensic records, generate a matching notification identifying the at least one record which the second image is determined to match, and
   output the generated matching notification on the device,
   wherein the input unit comprises:
   a laser light source configured to output at least two parallel laser lights on a surface of an object that includes the forensic input at the scene of forensic analysis, the at least two laser lights being output toward respectively different positions on the surface of the object, and
   a camera configured to generate the first image of the received forensic input that shows the at least two laser lights positioned on the surface of the object,
   wherein the processing unit is configured to determine at least one scaling dimension of the forensic input on the surface of the object contained in the first image based on a first positional relationship between the at least two laser lights output on the surface of the object and a second positional relationship between two points of interest in the first image.

2. The device according to claim 1, wherein the forensic records are recorded in the memory unit.

3. The device according to claim 1, comprising:
   a connection interface configured to receive the forensic records,
   wherein the processing unit is configured to record the received forensic records in the memory unit.

4. The device according to claim 3, wherein the connection interface includes at least one of:
   (a) a port configured to receive a wired connection to a computer to receive the forensic records, and
   (b) a transceiver configured to receive the forensic records via a wireless transmission.

5. The device according to claim 3, wherein the forensic records are received from a law enforcement database.

6. The device according to claim 1, wherein the input unit comprises a scanner configured to obtain a representation of at least one of a fingerprint, a group of fingerprints, and an area of a hand, and
   wherein the processing unit is configured to generate the first image from the obtained representation.

7. The device according to claim 6, wherein the device includes a housing having the memory unit, the input unit and the processing unit comprised therein.

8. The device according to claim 7, wherein the housing comprises an opening, and
   wherein the scanner is configured to be secured within the opening when not in use, and to be retractably extended from the opening for operation.

9. The device according to claim 1, wherein the processing unit is configured to associate identification information with the second image, the identification information including at least one identifying attribute about at least one of the forensic input, the scene of forensic analysis, a time the first image was generated, and an identification of an operator of the device.

10. The device according to claim 1, further comprising:
    an iris detection unit configured to capture data regarding at least one iris of an eye and output the captured data to the processing unit.

11. The device according to claim 1, wherein the input unit is configured to receive a plurality of forensic inputs at the scene of forensic analysis, and the processing unit is configured to analyze each of the forensic inputs.

12. The device according to claim 1, comprising:
    a display device,
    wherein the processing unit is configured to control the display device to display the generated matching notification, and
    wherein the matching notification includes an image of the at least one record which the second image is determined to match and a quality of match indicator that indicates how close the match is between the second image and the at least one record.

13. A portable, handheld device for forensic analysis, the device comprising:
    a memory unit having an executable program recorded therein;
    an input unit configured to receive a forensic input at a scene of forensic analysis at which the forensic input is collected; and
    a processing unit configured to, by executing the program recorded in the memory unit at the scene of forensic analysis,
    generate a first image of the received forensic input,
    scale the generated first image to a predetermined format suitable for forensic analysis, and generate a second image of the forensic input in which the first image is scaled to the predetermined format, record the second image of the forensic input in the memory unit, compare the second image with forensic records, each forensic record respectively including previously collected forensic data associated with one or more individuals or specimens, determine whether the second image matches at least a portion of at least one of the forensic records based on the comparison, upon determining that the second image matches at least a portion of at least one of the forensic records, generate a matching notification identifying the at least one record which the second image is determined to match, and output the generated matching notification on the device, wherein the forensic input is a latent fingerprint, and the input unit includes:

a laser light source configured to output at least two parallel laser lights on a surface of an object that includes the latent fingerprint at the scene of forensic analysis, the at least two laser lights being output toward respectively different positions on the surface of the object, and a camera configured to generate the first image of the latent fingerprint that shows the at least two laser lights positioned on the surface of the object, wherein the processing unit is configured to determine at least one scaling dimension of the latent fingerprint on the surface of the object contained in the first image based on a first positional relationship between the at least two laser lights output on the surface of the object and a second positional relationship between two points of interest in the first image.

14. The device according to claim 13, wherein the processing unit is configured to determine the scaling dimension of the latent fingerprint by measuring a distance between the different positions of the at least two laser lights on the surface of the object, determining an angle of the at least two laser lights with respect to the surface of the object, and determining a distance between the two points of interest in the second image.

15. The device according to claim 14, wherein the processing unit is configured to scale the second image of the latent fingerprint to the predetermined format by modifying dimensions of the latent fingerprint in the first image based on the determined scaling dimension of the latent fingerprint.

16. The device according to claim 13, wherein the processing unit is configured to identify portions of the second image that are external to the latent fingerprint in the second image, and crop out portions of the second image that are identified to be external to the latent fingerprint.

17. The device according to claim 16, wherein the processing unit is configured to receive a selected area of the second image that includes the latent fingerprint, and determine that any area of the second image outside the selected area constitutes a portion of the second image that is external to the latent fingerprint.

18. The device according to claim 13, wherein the processing unit is configured to at least one of:

filter out at least one of high and low frequency data from the second image using an adjustable spectral filter, filter out data from the second image using an adjustable spatial filter, and enhance the contrast of the latent fingerprint in the second image.

19. A portable, handheld device for forensic analysis, the device comprising:

a memory unit having an executable program recorded therein;

an input unit configured to receive a forensic input at a scene of forensic analysis at which the forensic input is collected;

at least one light source configured to output light of different colors toward a surface of an object at the scene of forensic analysis;

an operator interface configured to receive operator instructions regarding a selection of at least one of a color and an intensity of the selected at least one color to be output from the at least one light source; and a processing unit configured to, by executing the program recorded in the memory unit at the scene of forensic analysis, generate a first image of the received forensic input, scale the generated first image to a predetermined format suitable for forensic analysis, and generate a second image of the forensic input in which the first image is scaled to the predetermined format, record the second image of the forensic input in the memory unit, compare the second image with forensic records, each forensic record respectively including previously collected forensic data associated with one or more individuals or specimens, determine whether the second image matches at least a portion of at least one of the forensic records based on the comparison, upon determining that the second image matches at least a portion of at least one of the forensic records, generate a matching notification identifying the at least one record which the second image is determined to match, and output the generated matching notification on the device.

20. A portable, handheld device for forensic analysis, the device comprising:

a memory unit having an executable program recorded therein;

an input unit configured to receive a forensic input at a scene of forensic analysis at which the forensic input is collected;

a plurality of light sources each configured to output light of a predetermined color toward a surface an object at the scene of forensic analysis;

an operator interface to receive operator instructions regarding a selection of at least one of the plurality of light sources to output the predetermined color of the selected at least one of the light sources on the surface of the object at the scene of forensic analysis; and a processing unit configured to, by executing the program recorded in the memory unit at the scene of forensic analysis, generate a first image of the received forensic input, scale the generated first image to a predetermined format suitable for forensic analysis, and generate a second image of the forensic input in which the first image is scaled to the predetermined format, record the second image of the forensic input in the memory unit, compare the second image with forensic records, each forensic record respectively including previously collected forensic data associated with one or more individuals or specimens, determine whether the second image matches at least a portion of at least one of the forensic records based on the comparison, upon determining that the second image matches at least a portion of at least one of the forensic records, generate a matching notification identifying the at least one record which the second image is determined to match, and output the generated matching notification on the device.

21. A system, comprising:

a plurality of handheld devices, wherein each of the plurality of handheld devices respectively comprises:

a memory unit having an executable program recorded therein;

an input unit configured to receive a forensic input at a scene of forensic analysis at which the forensic input is collected; and a processing unit configured to, by executing the program recorded in the memory unit at the scene of forensic analysis, generate a first image of the received forensic input, scale the generated first image to a predetermined format suitable for forensic analysis, and generate a second image of the forensic input in which the first image is scaled to the predetermined format, record the second image of the forensic input in the memory unit, compare the second image with forensic records, each forensic record respectively including previously collected forensic data associated with one or more individuals or specimens, determine whether the second image matches at least a portion of at least one of the forensic records based on the comparison, upon determining that the second image matches at least a portion of at least one of the forensic records, generate a matching notification identifying the at least one record which the second image is determined to match, and output the generated matching notification on the device, wherein each of the handheld devices respectively comprises a transceiver configured to communicate with each other at the scene of forensic analysis, wherein the transceiver of a first one of the handheld devices is configured to transmit the second image to a second one of the handheld devices with identification information associated with the second image, wherein the processing unit of the second handheld device is configured to record the second image in the memory unit of the second handheld device with the identification information associated with the second image, and wherein the identification information includes at least one of a description of a location of the forensic input, an identity of an individual to whom the forensic input belongs, and a description of the scene of forensic analysis.

22. A portable, handheld device for forensic analysis, the device comprising:

a memory unit having an executable program recorded therein;

an input unit configured to receive a forensic input at a scene of forensic analysis at which the forensic input is collected; and a processing unit configured to, by executing the program recorded in the memory unit at the scene of forensic analysis, generate a first image of the received forensic input, scale the generated first image to a predetermined format suitable for forensic analysis, and generate a second image of the forensic input in which the first image is scaled to the predetermined format, record the second image of the forensic input in the memory unit, compare the second image with forensic records, each forensic record respectively including previously collected forensic data associated with one or more individuals or specimens, determine whether the second image matches at least a portion of at least one of the forensic records based on the comparison, upon determining that the second image matches at least a portion of at least one of the forensic records, generate a matching notification identifying the at least one record which the second image is determined to match, and output the generated matching notification on the device, wherein the forensic input is a latent fingerprint, and the handheld device includes:

an operator interface configured to receive a dimension associated with the latent fingerprint, wherein the processing unit is configured to determine a scaling dimension of the fingerprint on the surface of the object contained in the first image based on the received dimension.

23. A method for forensic analysis using a portable, handheld device, the method comprising:

receiving, by an input unit of the device, a forensic input at a scene of forensic analysis at which the forensic input is collected;

generating, by a processing unit of the device, a first image of the received forensic input;

scaling, by the processing unit, the generated first image to a predetermined format suitable for forensic analysis;

generating, by the processing unit, a second image of the forensic input in which the first image is scaled to the predetermined format;

recording, by the processing unit, the second image of the forensic input in a memory unit of the device;

comparing, by the processing unit, the second image with forensic records, each forensic record respectively including previously collected forensic data associated with one or more individuals or specimens;

determining, by the processing unit, whether the second image matches at least a portion of at least one of the forensic records based on the comparison;

upon determining that the second image matches at least a portion of at least one of the forensic records, generating, by the processing unit, a matching notification identifying the at least one record which the second image is determined to match; and outputting, by the processing unit, the generated matching notification on the device, wherein the generating of the first image comprises outputting at least two parallel laser lights on a surface of an object that includes the forensic input at the scene of forensic analysis, the at least two laser lights being output toward respectively different positions on the surface of the object, and generating the first image of the received forensic input that shows the at least two laser lights positioned on the surface of the object, and wherein the scaling of the generated first image comprises determining at least one scaling dimension of the forensic input on the surface of the object contained in the first image based on a first positional relationship between the at least two laser lights output on the surface of the object and a second positional relationship between two points of interest in the first image.

24. A non-transitory computer-readable storage medium having computer-readable instructions tangibly recorded thereon which, when executed by a processing unit of a portable handheld device for forensic analysis, cause the processing unit to perform a method for forensic analysis, the method comprising:

receiving a forensic input at a scene of forensic analysis at which the forensic input is collected;

generating a first image of the received forensic input;

scaling the generated first image to a predetermined format suitable for the forensic analysis;

generating a second image of the forensic input in which the first image is scaled to the predetermined format;

recording the second image of the forensic input in a memory unit of the device;

comparing the second image with forensic records, each forensic record respectively including previously collected forensic data associated with one or more individuals or specimens;

determining whether the second image matches at least a portion of at least one of the forensic records based on the comparison;

upon determining that the second image matches at least a portion of at least one of the forensic records, generating a matching notification identifying the at least one record which the second image is determined to match; and outputting the generated matching notification on the device, wherein the generating of the first image comprises outputting at least two parallel laser lights on a surface of an object that includes the forensic input at the scene of forensic analysis, the at least two laser lights being output toward respectively different positions on the surface of the object, and generating the first image of the received forensic input that shows the at least two laser lights positioned on the surface of the object, and wherein the scaling of the generated first image comprises determining at least one scaling dimension of the forensic input on the surface of the object contained in the first image based on a first positional relationship between the at least two laser lights output on the surface of the object and a second positional relationship between two points of interest in the first image.

* * * * *